US00RE37173E

(19) United States
(12) Reissued Patent
Jefferson, Jr. et al.

(10) Patent Number: US RE37,173 E
(45) Date of Reissued Patent: May 15, 2001

(54) COFFEE AND TEA BREWING APPARATUS AND SYSTEM

(75) Inventors: Harry D. Jefferson, Jr., 60 N. Beretania St., Suite 3503, Honolulu, HI (US) 96817; Dale W. Ploeger, Menlo Park, CA (US)

(73) Assignee: Harry D. Jefferson, Jr.

(21) Appl. No.: 09/401,718

(22) Filed: Sep. 23, 1999

Related U.S. Patent Documents

Reissue of:
(64) Patent No.: 5,669,287
Issued: Sep. 23, 1997
Appl. No.: 08/504,701
Filed: Jul. 20, 1995

(51) Int. Cl.[7] ..... A47J 37/00
(52) U.S. Cl. ..... 99/299; 99/283; 99/295; 99/302 R; 99/304
(58) Field of Search ..... 99/299, 283, 307, 99/295, 302 R, 304, 275, 279; 426/433

(56) References Cited

U.S. PATENT DOCUMENTS

| | | | | |
|---|---|---|---|---|
| 4,108,053 | * | 8/1978 | Vink | 99/306 |
| 4,149,454 | * | 4/1979 | Kemp | 99/295 |
| 4,191,100 | * | 3/1980 | Marotta | 99/299 |
| 4,343,232 | * | 8/1982 | Corbier | 99/299 |
| 4,790,240 | * | 12/1988 | Henn et al. | 99/282 |
| 4,805,523 | * | 2/1989 | Stuckey et al. | 99/281 |
| 4,843,955 | * | 7/1989 | Henn et al. | 99/295 |
| 4,882,983 | * | 11/1989 | Pastrick | 99/295 |
| 4,888,466 | * | 12/1989 | Hoffmann | 99/307 X |
| 4,893,552 | * | 1/1990 | Wunder | 99/299 |
| 4,904,845 | * | 2/1990 | Wonka | 219/283 |
| 4,911,067 | * | 3/1990 | Oppermann | 99/299 |
| 4,922,809 | * | 5/1990 | Fuhner | 99/283 |
| 5,063,837 | * | 11/1991 | Precht | 99/299 |

FOREIGN PATENT DOCUMENTS

| | | | |
|---|---|---|---|
| 2839295 | * | 3/1980 | (DE) . |
| 0234790 | * | 4/1986 | (DE) . |
| 3935384 | * | 5/1991 | (DE) . |
| 0019291 | * | 11/1980 | (EP) . |
| 2260891 | * | 5/1993 | (GB) . |

OTHER PUBLICATIONS

"Brewed Coffee" Consumer Reports, Oct. 1994, pp. 640–653.*

* cited by examiner

*Primary Examiner*—Reginald L. Alexander
(74) *Attorney, Agent, or Firm*—Sonnenschein Nath & Rosenthal

(57) ABSTRACT

A method and system for brewing a desired volume of coffee at a selected brew time, in which a volume of water corresponding to the desired volume of coffee is heated and directed into contact with coffee grounds in a brewing chamber. Contact between at least a portion of the heated water and the coffee grounds is maintained for approximately the selected brew time to form brewed coffee. The brewing time, however, is substantially independent of the desired volume of coffee to be brewed and is controlled by control of the rate at which heated liquid flows into or out of the brewing chamber. At the expiration of the brewing time, brewed coffee is released through an opening in the brewing chamber and into an underlying receptacle.

31 Claims, 15 Drawing Sheets

COFFEE AND TEA BREWING APPARATUS AND SYSTEM

Matter enclosed in heavy brackets [ ] appears in the original patent but forms no part of this reissue specification; matter printed in italics indicates the additions made by reissue.

FIELD OF THE INVENTION

The present invention relates generally to the field of cooking appliances and particularly to the field of apparatuses and systems for brewing coffee and tea.

BACKGROUND OF THE INVENTION

Coffee is brewed by placing hot water into contact with ground, roasted coffee for a given period of time. Coffee beans contain approximately 600 chemical compounds, a high percentage of which result in bitter and poor tasting coffee, which is often incorrectly referred to as "strong coffee." These undesirable compounds are normally released into brewed coffee when the hot water remains in contact with the ground coffee beans for relatively long durations. A primary influence on the taste of brewed coffee is therefore the "brew time," the amount of time that the heated water is in contact with the ground coffee beans. Brew time is similarly important to the brewing of teas.

Experts in the coffee industry recommend brewing so-called "regular grind" coffee using brew times within the range of two to four minutes, where the brew time is the amount of time for which heated liquid is in contact with the ground beans. For free grinds (often called "espresso grinds"), brew times of approximately 20 to 30 seconds are recommended. It is also recommended that water which has been heated to approximately 205° F. be used for brewing coffee.

In a typical coffee maker available for commercial and consumer use, coffee grounds are held in a paper filter which rests inside a cone-shaped plastic or metal chamber. An aperture having fixed dimensions is formed at the bottom of the chamber. Heated water (which in the prior art is usually only heated to between 170° and 185° F.) is pumped onto the coffee grounds in the plastic chamber at a relatively constant rate (which, as discussed below, is too low and thus results in a brew time that is too long). Brewed coffee flows from the brewing chamber through the aperture, and accumulates in a receptacle positioned below the brewing chamber. The rate at which the brewed coffee flows out of the brewing chamber is relatively constant and is dependent upon the diameter of the aperture and the flow restriction caused by coffee accumulation on the filter surface.

Because this prior art coffee maker pumps heated water onto the coffee grounds and discharges brewed coffee from the brewing chamber at constant flow rates, the amount of time during which the liquid is in contact with the coffee grounds is proportional to the amount of coffee to be brewed. For example, if a large quantity of coffee is to be brewed, the large volume of brewed coffee will take longer to flow into and drain from the brewing chamber than would a smaller volume. The brew time for a volume of four cups of coffee is thus approximately one-third the time of that for twelve cups. The prior art coffee maker therefore maintains contact between the coffee grounds and the liquid for durations that are much longer time than those recommended. Amongst currently available coffee makers, these durations range from approximately eight minutes to 15 minutes for 12 cups, where a "cup" of coffee is normally approximately 5 fluid ounces.

Prior art coffee makers utilize various mechanisms for pumping heated water in the brewing chamber. One such prior art coffee maker utilizes a "thermal pump" to heat water and deliver the heated water into the brewing chamber.

To brew coffee in a thermal pump device, a user fills a reservoir in the coffee maker with cool water. The water flows downwardly from the reservoir through flexible tubing, then through a check valve, and finally into a metal tube which is heated by a hot plate that also supports a coffee pot. A vertically-oriented plastic tube is continuous with the heated tube and has a discharge end which extends into the brewing chamber.

When the reservoir is filled with water, both the heated tube and the plastic tube become filled with a column of water. The user activates a power switch to begin brewing, causing the heating tube to heat the water inside it to the point of boiling. The boiling water generates a steam bubble which rises and pushes the column of water in the vertical section of tube upwardly, until the column of water flows out the discharge end of the tube and flows over the ground coffee. As the water exits the tube, the pressure on the bubble is reduced. The bubble thus expands rapidly and pushes the column of water out in a short burst. The check valve prevents the steam bubble from pushing the water back into the reservoir.

Once the steam bubble has exited the tube, additional water enters the tube from the reservoir and the cycle repeats. This system produces a "pulsed" flow which has a relatively constant flow rate averaged over the total flow time.

Another currently available coffee maker employs thermal pulse technology in combination with a diverter valve that diverts a portion of the heated water directly into the coffee pot below the brewing chamber, while the remainder of the heated water is directed into the brewing chamber. The diverted water dilutes the brewed coffee and reduces its perceived "strength." This method, which is sometimes referred to as the 80/20 method since approximately 20% of the heated water is diverted, is found in brewing systems sold for commercial use as well as those sold for the home.

A third type of currently available coffee brewing system has a pumping mechanism which utilizes a heated vessel similar to a residential hot water heater. At all times, water having a temperature of 200° F. is held in the heated vessel. To brew coffee, a user pours the appropriate mount of cool water through an opening on the top of the machine. The cool water flows through a tube into the heated vessel and displaces the heated water, causing it to exit from the heated vessel via an outlet positioned over the coffee grounds. The cool water poured into the heated vessel subsequently becomes heated to 200° F. in preparation for the next coffee-making cycle.

The heated vessel system is advantageous over the thermal pulse system in that the rate at which heated water flows onto the coffee grounds in the heated vessel system is substantially higher. For example, 10 cups of coffee are typically brewed in approximately four minutes.

Although each of the above-described coffee brewing systems are somewhat satisfactory for brewing small quantities of coffee, it has been found that the taste of coffee brewed using those systems is inconsistent over the range of volumes of coffee that those systems can produce. It has been discovered that coffee having consistent flavor can be produced, regardless of the volume of coffee being brewed at one time, if the brew time used in the brewing process is substantially the same for any volume of coffee being brewed in the system. Each of the prior art systems described above lacks a feature which will maintain a consistent brew time regardless of the quantity of coffee to be made in the system. A new coffee making system which utilizes a consistent brew time is therefore desirable.

SUMMARY OF THE INVENTION

The present invention is a method and system for brewing a desired volume of coffee at a selected brew time. A volume of water corresponding to the desired volume of coffee is heated and directed into contact with coffee grounds in a brewing chamber. Contact between at least a portion of the heated water and the coffee grounds is maintained for approximately the selected brew time to form brewed coffee. The brewing time, however, is independent of the desired volume of coffee to be brewed. At the expiration of the brewing time, brewed coffee is released through an opening in the brewing chamber and into an underlying receptacle.

The advantage of this new coffee maker is that it allows a user to brew coffee which will be of consistent quality regardless of the mount of coffee brewed. This is achieved by maintaining a constant "brew time," i.e. the time the ground coffee is exposed to hot water, regardless of the amount of coffee to be made. In the preferred embodiment, this is achieved by quickly dispensing heated water into a brewing chamber that contains the ground coffee. The flow of the water out of the brewing chamber is controlled so that the ground coffee is exposed to heated water in the brewing chamber for the desired brewing time.

The coffee making system of the present invention provides consistently superior tasting coffee and further allows the user to control the brewing time to adjust the coffee taste according to personal preference and experience and is adaptable to standard ground coffee and fine ground espresso type grind.

DETAILED DESCRIPTION OF THE INVENTION

The present invention controls the amount of time for which heated liquid is in contact with ground coffee in order to enable consistent production of superior tasting coffee, regardless of the volume of coffee to be made. Control of brew time is maintained by controlling the rate of fluid flow at one of two points in the brewing system: at the point where brewed coffee exits the brewing chamber (the chamber in which the heated water and grounds are combined) or at the point where heated water is introduced into the brewing chamber. Examples of each type of brewing time control will be described below. Although these examples are given with respect to coffee, it should be understood that the invention is equally applicable to other brewed liquids, such as teas.

Output Control

The preferred embodiment and several of the alternative embodiments control brew time by regulating the rate of flow of brewed coffee out of the brewing chamber.

Figure 2B:
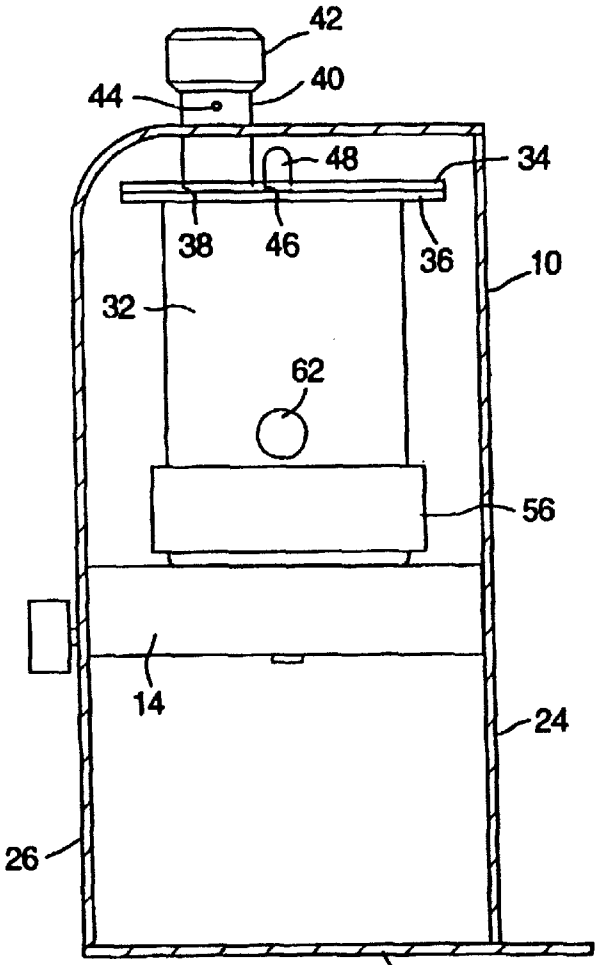
FIGS. 2A and 2B are a front cross-section view and a side cross-section view, respectively, of a coffee maker according to the present invention.
Figure 2A:
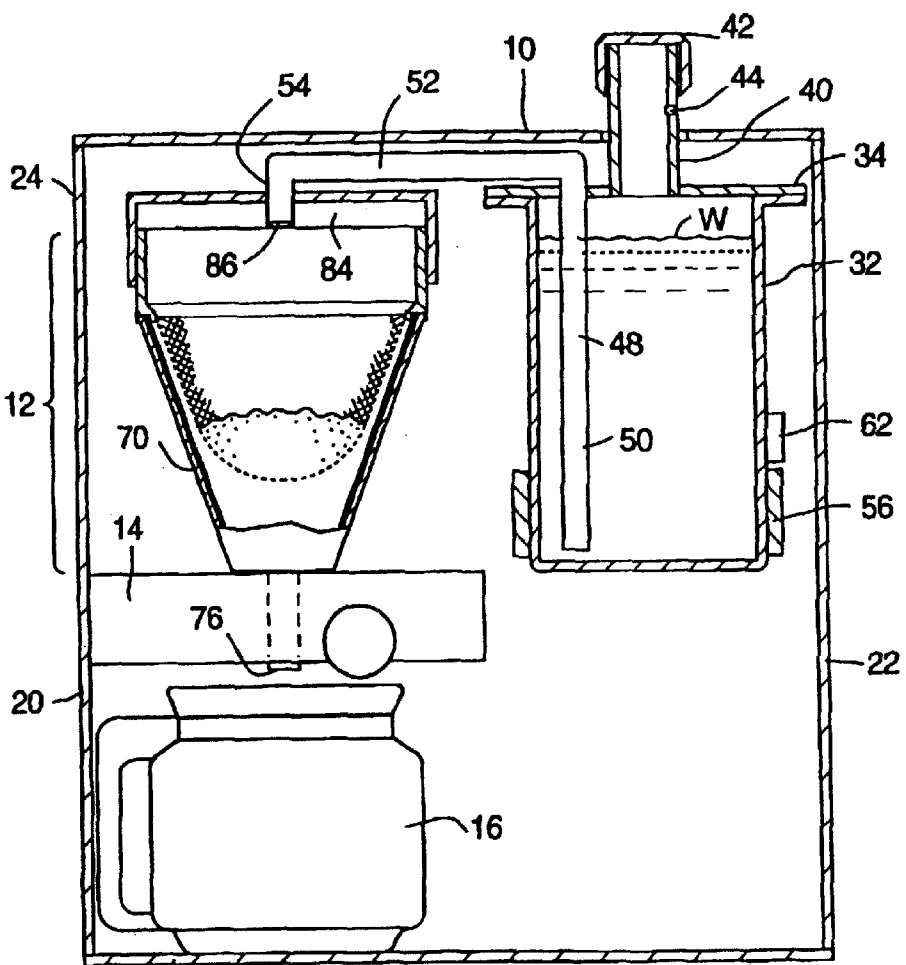
Figure 3:
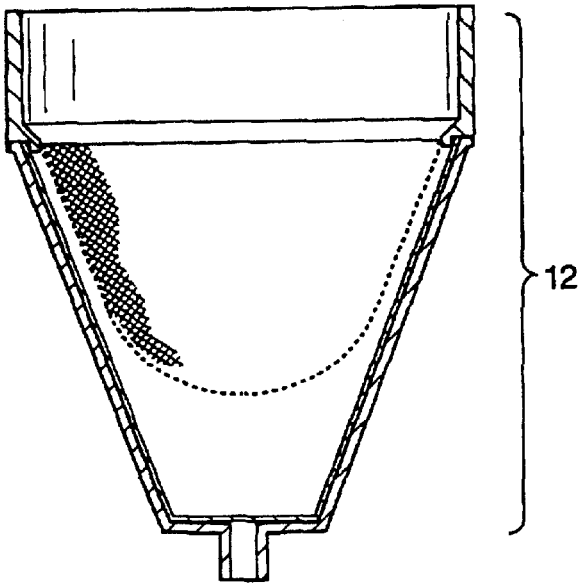
FIG. 3 is a side plan view of a brewing chamber assembly according to the present invention.

Referring to FIG. 2A, the preferred embodiment is comprised generally of a housing 10, a heated water vessel 32, a brewing chamber assembly 12, a valve body 14, and a coffee receptacle 16. Generally speaking, during operation water is heated in the vessel 32 and pumped in a continuous flow into the brewing chamber 12 where it contacts coffee grounds. A pre-determined "brew time," i.e. the approximate time for which heated water is in contact with the coffee grounds, is ensured by the valve body 14 which is adjusted to increase or decrease the rate of liquid flow from the brewing chamber 12.

Figure 1:
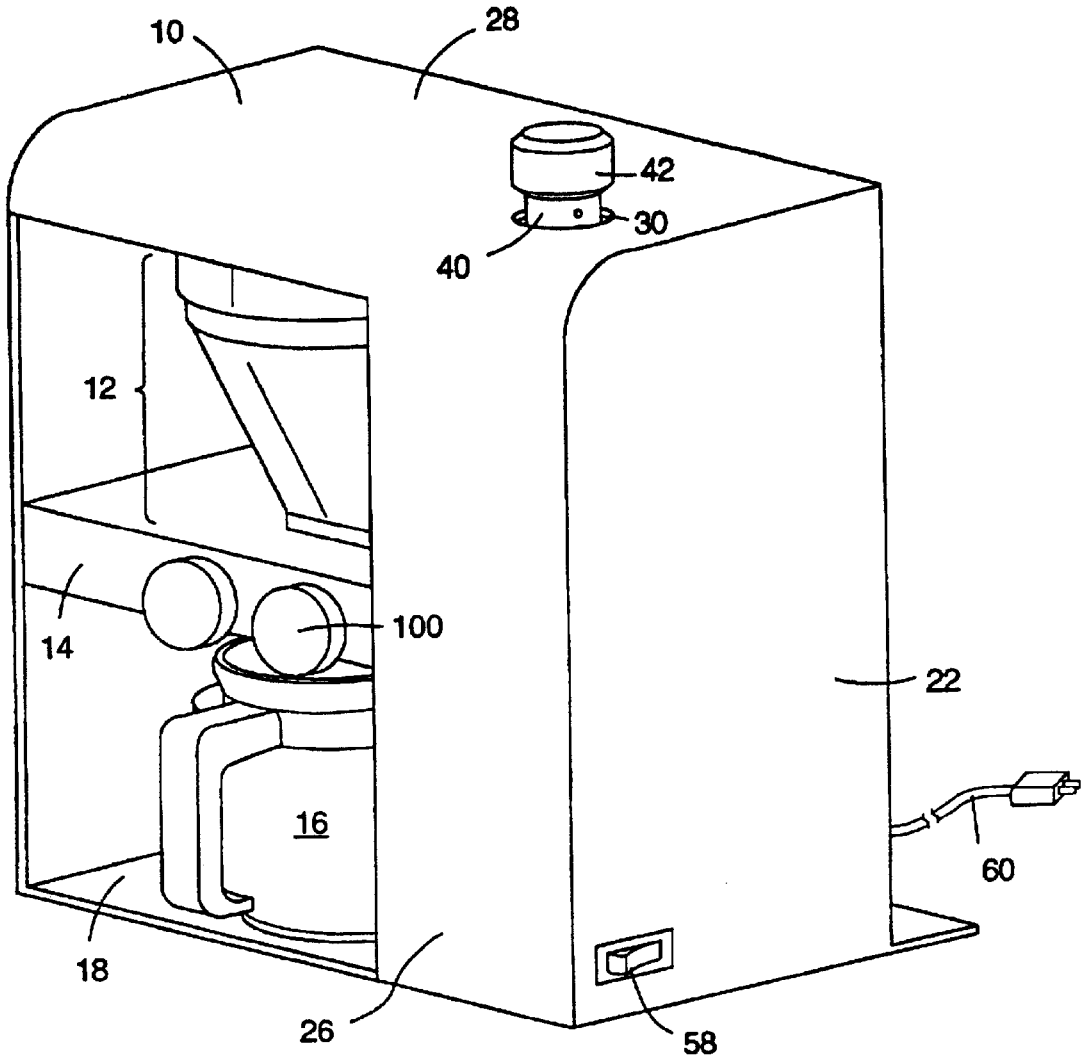
FIG. 1 is a perspective view of a coffee maker according to the present invention.

A front section view of the coffee maker according to the preferred embodiment is shown in FIG. 2A and a side section view is shown in FIG. 2B. As can be seen, the housing 10 includes a base wall 18, a pair of side walls 20, 22, and a back wall 24. As shown in FIG. 1, a front wall 26 covers one side of the housing 10. The housing 10 also has a top wall 28 which has an opening 30 on one side.

Referring again to FIGS. 2A and 2B, water to be heated for use in the brewing process is heated in a vessel 32 which is mounted to back wall 24 of the housing 10. The vessel preferably has a two-liter capacity and is preferably made of stainless steel. A lid 34 for the vessel 32 is preferably sealed to a flange 36 welded to the vessel by conventional means. An opening 38 is formed in the lid 34 (FIG. 2B).

A fill tube 40 extends through the opening 38 in the lid 34 and through the opening 30 in top wall 28 of the housing 10 (FIG. 1). Fill tube 40 has a cap 42 which seals the fill tube against some steam and/or pressure loss, although a vent 44 having a diameter of approximately 0.030 inches is formed in the fill tube 40 just beneath the cap 42. During use the vent 44 allows a small amount of steam to escape from the vessel when water in the vessel is heated.

A second hole 46 in the lid 34 of vessel 32 receives a discharge tube 48. In the preferred embodiment, discharge tube 48 has a long vertical portion 50 which extends downwardly through the hole 46 in the lid 34 and which reaches to within ⅛" of the bottom of the vessel 32. Extending approximately perpendicularly of vertical portion 50 is substantially horizontal portion 52 which is in fluid communication with vertical portion 50. Finally, a discharge end 54 extends downwardly from (and is in fluid communication with) horizontal portion 52. Discharge end 54 provides an outlet through which heated water enters the brewing chamber 12 as will be described in detail below.

A heater 56 is attached to the exterior of vessel 32. Heater 56 is preferably a 900 to 1200 Watt band heater which is electrically coupled (by conventional means) via a thermostat 62 to a power switch 58. The power switch is in turn electrically coupled in a conventional manner to a source of power such as a battery (not shown) or a power cord 60 which may be plugged into a wall outlet.

Thermostat 62 is fixed to the vessel 32 just above the heater 56. When the thermostat detects a vessel wall temperature of in excess of 240°F., it automatically switches off the power to the heater to prevent overheating of the vessel.

The brewing chamber 12 will next be described. Referring to FIGS. 3 and 4A–4C, it can be seen that one preferred brewing chamber assembly 12 has three general components. The first component is a screen component 64 which includes a plastic ring 66 having upper and lower edges 65, 67. Attached to edge 67 of the ring 66 is a screen 68. The screen 68 is preferably formed of 20 mesh screen using 0.010 inch diameter stainless steel wire.

Figure 4A:
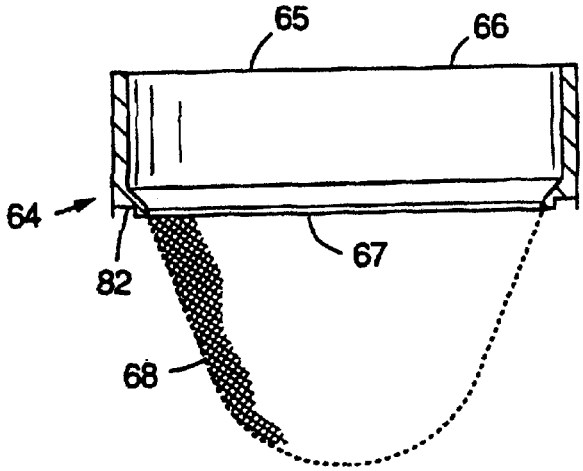
FIGS. 4A, 4B, and 4C are side plan views of the screen assembly, filter, and cone of the brewing chamber assembly of FIG. 3.
Figure 4B:
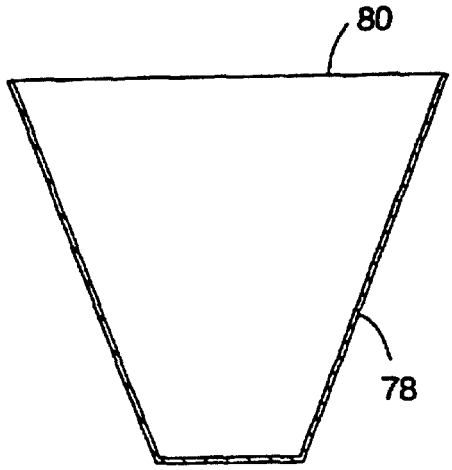
Figure 4C:
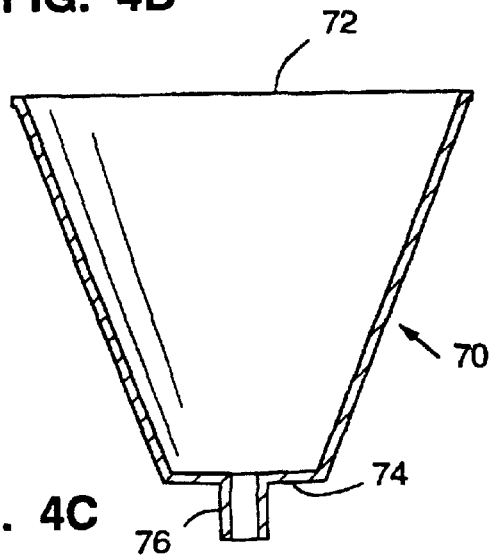

A second part of the brewing chamber assembly 12 is a plastic or metal cone 70 (FIG. 4C) which is circular in cross-section and which has an open top 72. The bottom of the cone 70 is closed by bottom wall 74. A tube 76 which is in fluid communication with the interior of the cone 70 protrudes from the cone as shown in FIG. 4C. The tube 76 is preferably made of food grade silicone and has a preferred inner diameter of 0.5 inches.

A filter 78 is disposed between the screen component 64 and the cone 70 in the brewing chamber assembly 12. The filter 78 is preferably a paper, nylon or gold filter of the type generally available for use with drip coffee makers, although filters of any of a variety of materials may be used in the system. For the purpose of this description, the term "filter" will be used to denote any of type of filter useful for brewing coffee and/or tea, including those made from paper, nylon or metal. Teas having large or whole leaves may be brewed without a filter, since such teas are relatively free of small particles which would require removal by a filter.

When brewing chamber assembly 12 is assembled, upper edge 80 of filter 78 is pinched between a skirt 82 at the base of ring 66 and the top 72 of cone 70 in order to trap and seal the edge of the filter. This prevents the filter from collapsing or folding during use, and prevents heated water from by-passing the filter. The connection between ring 66 and top 72 of cone 70 should preferably be leak-proof, since the entire brew chamber (which preferably has a capacity of approximately 60 oz, corresponding to 12 "cups" of coffee) may fill with heated water during use.

As described above, a beneficial way to maintain a constant brew time is to closely control the rate at which water exits the brewing chamber, since the more quickly water exits the brewing chamber the shorter the brew time. The screen holder 66 and screen 68 in the brewing chamber assembly 12 facilitate control of the rate at which water enters and exits the brewing chamber 12.

Figure 5A:
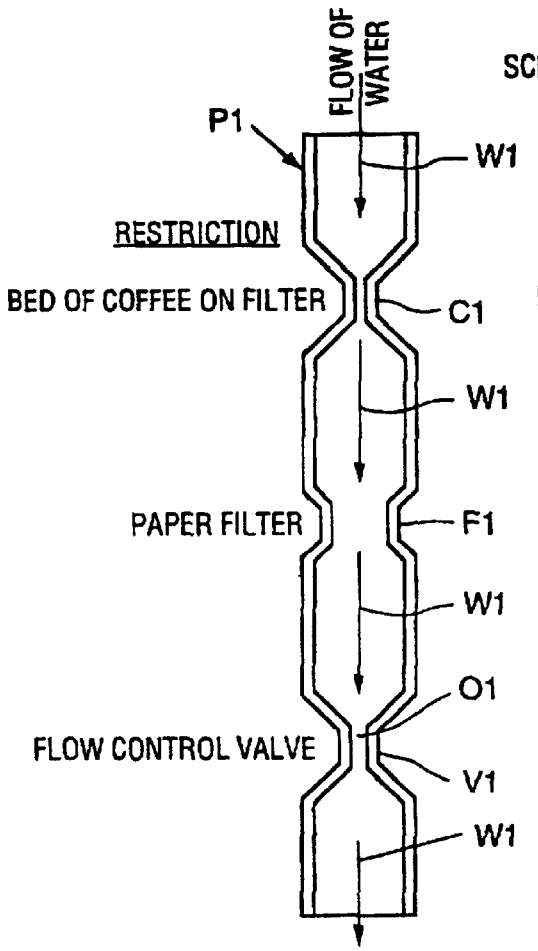
(PRIOR ART) FIG. 5A
FIGS. 5A and 5B are schematic models of fluid flow through a prior art coffee maker brewing assembly and through a brewing assembly according to the present invention, respectively.

As described above, in conventional coffee makers the wet bed of coffee grounds and the wet paper filter inside the brewing chamber restrict flow out of the brewing chamber. The flow of the water out of the brewing chamber can be modeled as a pipe P1 with a series of restrictions as shown in FIG. 5A. Water flowing through the pipe model P1 is represented by arrows labeled W1. As shown, the water must flow through a bed of coffee grounds C1, then through the filter F1, and finally through an orifice O1 which has a set diameter opening and which includes a flow control valve V1 for controlling rate of flow through the orifice O1. Since active control of the liquid flow is most easily carried out at the flow control valve, the flow control valve should be the most restrictive element along the flow path of the water. However, because of the thickness and density of the bed of coffee which is placed inside the brewing chamber, the bed of coffee is instead the most restrictive element in the flow path and it thus impedes the effectiveness of the flow control valve. It is therefore desirable to reduce the amount of flow restriction caused by the coffee bed, so that the flow control valve will more effectively control the flow rate of the water.

Figure 5B:
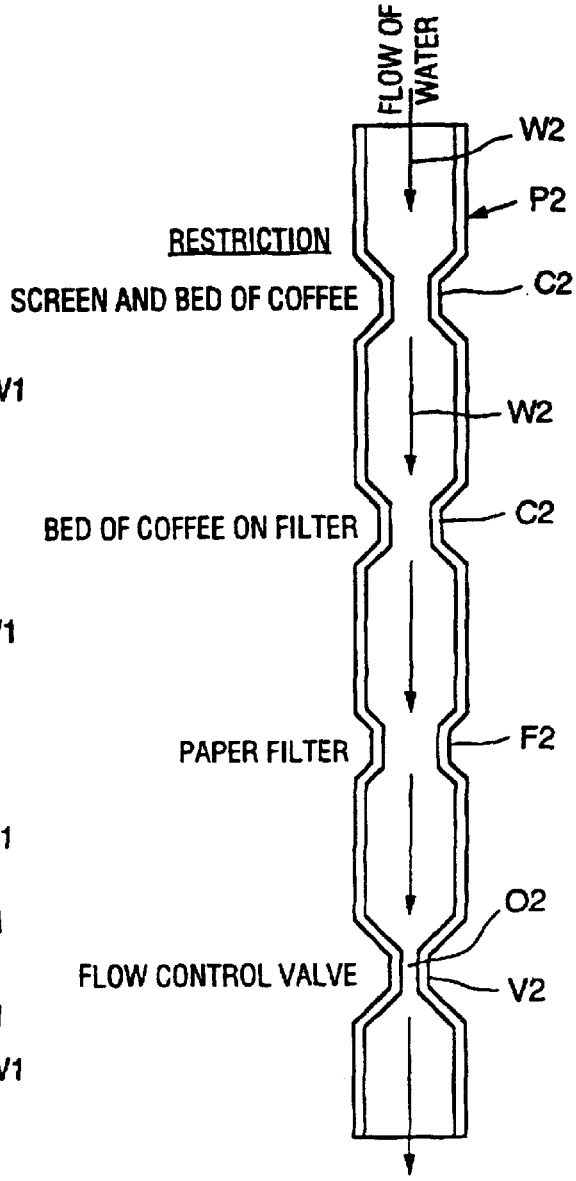
Figure 20:
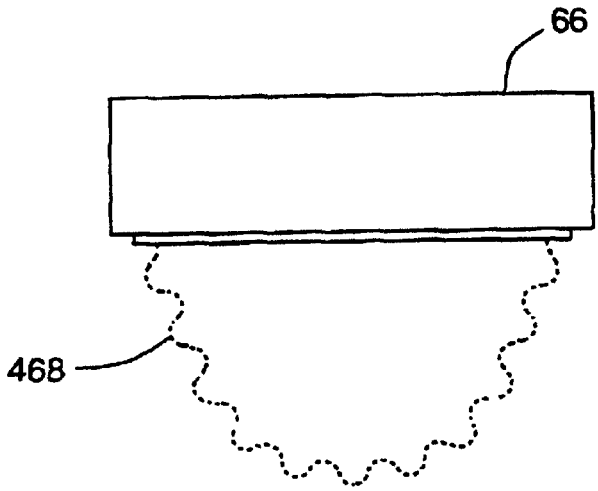
FIG. 20 is a side elevation view of an alternate embodiment of a screen component, in which the screen has a convoluted surface.

The brewing chamber design of the present invention is an effective means for reducing the amount of restriction caused by the bed of coffee in the brewing chamber. When coffee is loaded into the brewing chamber, the coffee grounds are trapped by the screen 68. As heated water quickly enters the brewing chamber, a slurry is formed and as the water drains from the brewing chamber approximately 70% of the grounds are trapped by the screen while others fall through the screen and onto the filter 78. The screen therefore prevents the bed of coffee grounds from becoming too thick on the filter and it allows water to flow easily through the screen and through grounds trapped on the screen. The bed of coffee on the filter (which is thus reduced by approximately 70%) is less restrictive than it would be without the screen and the flow rate through this layer is thus increased. The overall restrictive effect of the coffee grounds is less than it would be without the screen and it leaves the flow control valve with a dominant role in controlling the flow of water. This point is illustrated in the "pipe model" P2 of FIG. 5B, in which flow restriction of the brewing chamber of the present invention is modeled and in which W2, C2, F2 and V2 designate the water flow, coffee layers, filter, and control valve, respectively. Referring to FIG. 20, it may also be desirable to replace screen 68 with a screen or weir 468 which has a convoluted surface in order to increase the screen's surface area such that the bed of coffee which forms on the screen has a smaller thickness.

Figure 6A:
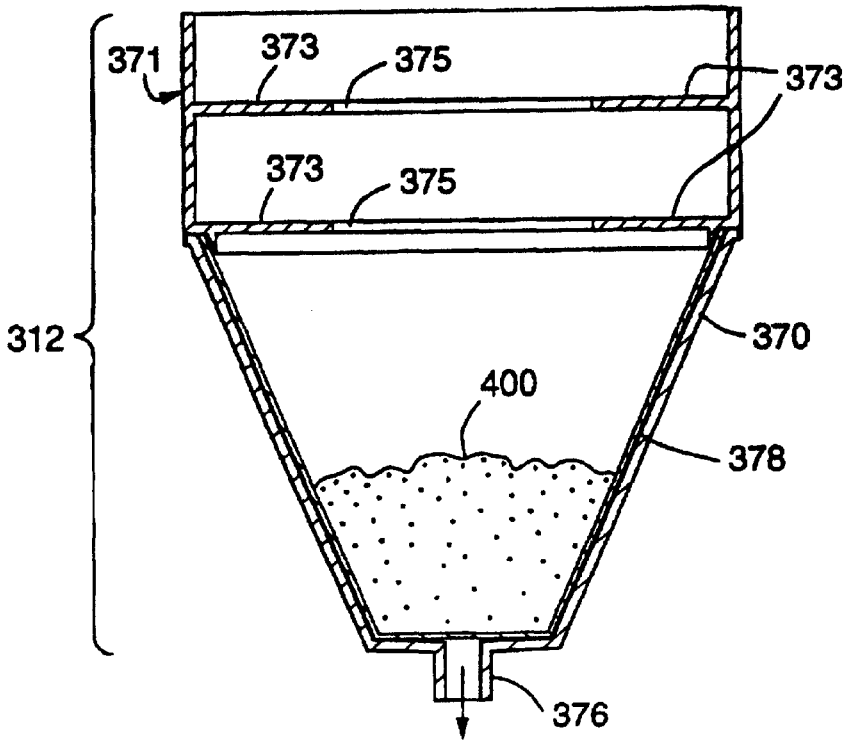
FIGS. 6A and 6B are cross-sectional side views of a second embodiment of a brew chamber assembly according to the present invention.
Figure 6B:
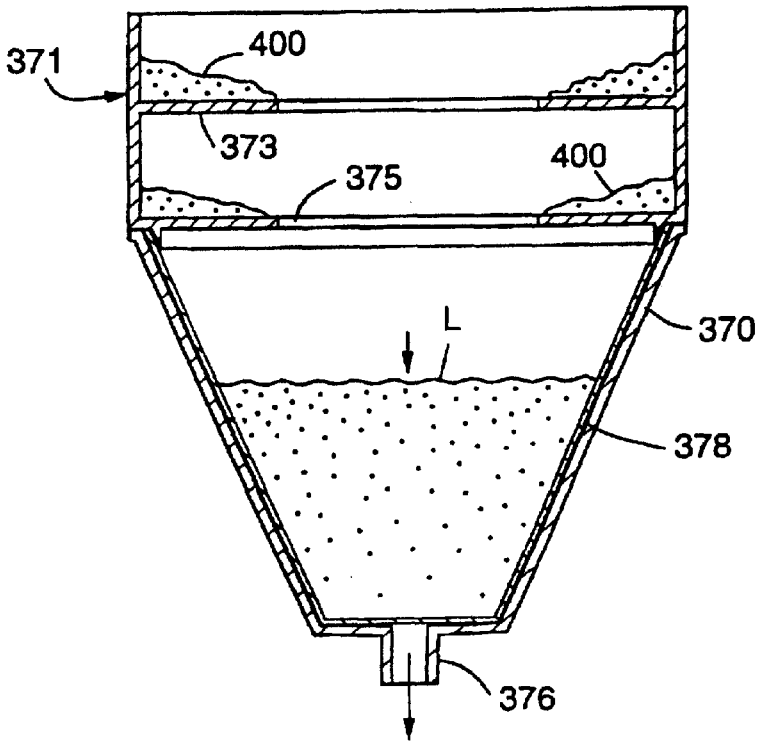

An alternative brewing chamber assembly 312 is shown in FIGS. 6A and 6B. The brewing chamber assembly 312 includes a cone 370 and a tube 376 extending substantially downwardly of the cone 370. A filter 378 is positioned inside the cone 370.

Detachably mounted to the top of the cone 370 is an extension 371 which includes a pair of substantially parallel weirs 373 extending across it. Each weir 373 has an opening 375 formed through it which is preferably vertically aligned with the opening in the other of the weirs 373. During use of the alternative brewing chamber 312, the extension 371 is removed from the cone 370 and ground coffee 400 is placed in the filter 378. When heated water is pumped into the brewing chamber (as will be described in detail below), the coffee grounds and water form a slurry that rises above the weirs 373. As liquid flows through the brew chamber assembly 312 into the coffee pot (see pot 16 in FIG. 2A), the liquid level L (FIG. 6B) in the brewing chamber decreases and the ground coffee in the slurry begins to settle. A substantial portion of the ground coffee 400 settles on the top surfaces of the weirs as shown in FIG. 6B, thereby preventing a flow restrictive (i.e. thick) layer of coffee grounds from forming on the filter.

Referring to FIG. 2A, brewing chamber assembly 12 (or, alternatively, brewing chamber assembly 312 of FIGS. 6A and 6B) mounts to a cover 84 which is attached to rear wall 24 of the housing 10. Cover 84 has an opening 86 through which discharge end 54 of the discharge tube 48 extends.

When brewing chamber assembly is mounted to the cover, tube 76 is made to extend through valve body 14. Valve body 14 is mounted to side wall 20 and back wall 24 of the housing 10. Generally speaking, the valve body 14 includes a valve through which brewed coffee flows to exit the brewing chamber 12. The rate at which the coffee exits the control chamber is controlled by the valve in order to control the brew time of the coffee. For example, assume a brew time of two minutes is desired and further assume that a volume of twelve cups of coffee is to be made. There will be a large volume of water in the brewing chamber during brewing, and because it will take that large volume a longer time to exit the brewing chamber than it would a smaller volume, the flow rate out of the brewing chamber must be relatively high in order for all of the brewed coffee to have exited the brewing chamber at the end of the two minute brew time. On the other hand, when only four cups of coffee are to made, the flow rate out of the brewing chamber will be slower in order that water in the brewing chamber can remain in contact with the coffee grounds for the full two minutes.

Figure 7B:
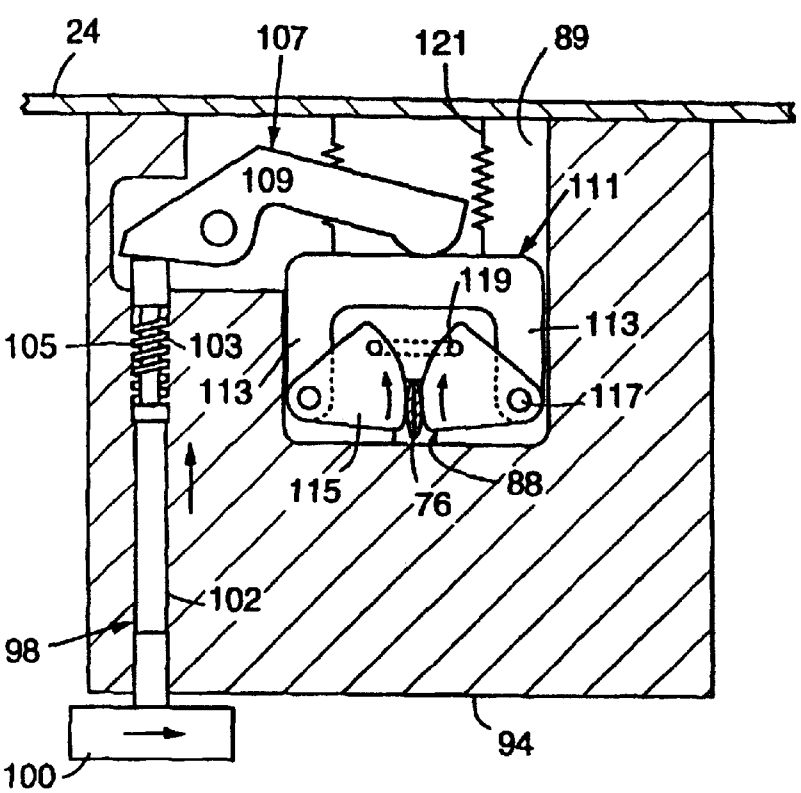
FIGS. 7A and 7B are partial cross-section views of the underside of the preferred valve body of the coffee maker of the present invention.
Figure 7A:
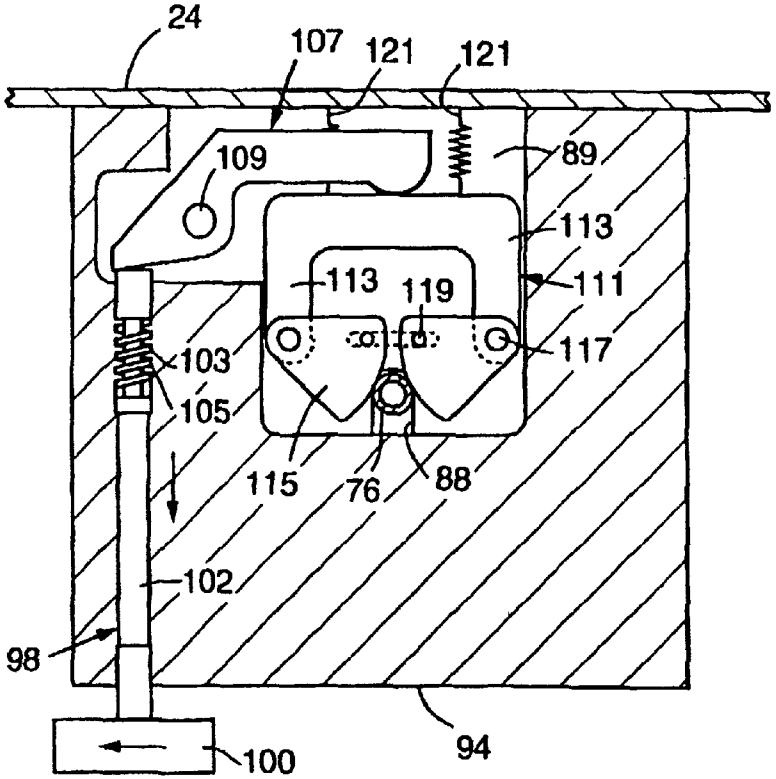

The control valve which controls the rate of flow of brewed coffee out of the brewing chamber is shown in FIGS. 7A and 7B, which are cross-sectional bottom views of the valve body 14. As shown, the valve body 14 has a rectangular opening 88, which extends completely through the valve body in a vertical direction, and a second opening 89 which extends from the back 24 of the housing towards the from 94 of the valve body and which does not pass completely through the valve body. The openings 88 and 89 join one another as shown in FIG. 7A. The silicone tube 76 which extends from cone 70, see FIG. 4C, (or tubing 376 on cone 370, FIG. 6A) extends downwardly through the opening 88.

A control knob assembly, designated generally as 98, includes a rod 102 extending through a bore which extends from front 94 of the valve body 14 to the opening 88. The rod 102 includes a threaded portion 103 which engages with threads 105 in the valve body. At one end of the rod 102 is a control knob 100 which is located at the front 94 of the valve body. The other end of the rod 102 abuts a rocker arm 107 which is pivotal about rocker arm pivot 109 fixed within the valve body 14.

Rocker arm 107 is in turn in abutment with a U-shaped yoke 111 that has a pair of parallel arms 113. The yoke 111 is slidable within the openings 88, 89 in a direction parallel to the longitudinal axis of rod 102. Yoke 111 is biased in the position shown in FIG. 7A (i.e. towards back wall 24) by springs 121 extending between yoke 111 and back wall 24.

A pair of wedge-shaped valve cams 115 are pivotally mounted to the arms 113 by pivot pins 117. Each cam 115 has a rounded side which faces the rounded side of the other cam. Tube 76 is positioned between the rounded sides of the cams as shown.

Each valve cam 115 has a guide pin 119 which is slidable within a guide slot (not shown, but its orientation relative to the pins is shown in dashed lines and designated 119 in FIGS. 7A and 7B) in valve body 14.

FIG. 7A shows the control valve assembly in a fully open position. To close the valve, control knob 100 is rotated in the direction indicated in FIG. 7B, causing rod 102 to advance within the valve body due to the interaction of threaded portion 103 with threads 105. As rod 102 advances, it pushes against the rocker arm causing the rocker arm to pivot about rocker arm pivot 109 and to in turn push the yoke 111 towards the front 94 of the valve body 14. As the yoke 111 moves forward, it causes the cams 115 to pivot in the direction of the arrows shown in FIG. 7B and to thereby squeeze the tube 76 between themselves. The yoke may also be moved forward in other ways within the scope of the present invention, such as by a leadscrew coupled between it and an electric motor. To open the valve, knob 100 is rotated in the direction indicated in FIG. 7A, causing rocker arm 107 to pivot away from yoke 111 and permitting yoke 111 to slide by action of springs 121 towards back wall 24. This backwards movement of the yoke 111 causes the cams 115 to pivot into the orientation shown in FIG. 7A and to thereby relieve compression on the tube 76.

Figure 9:
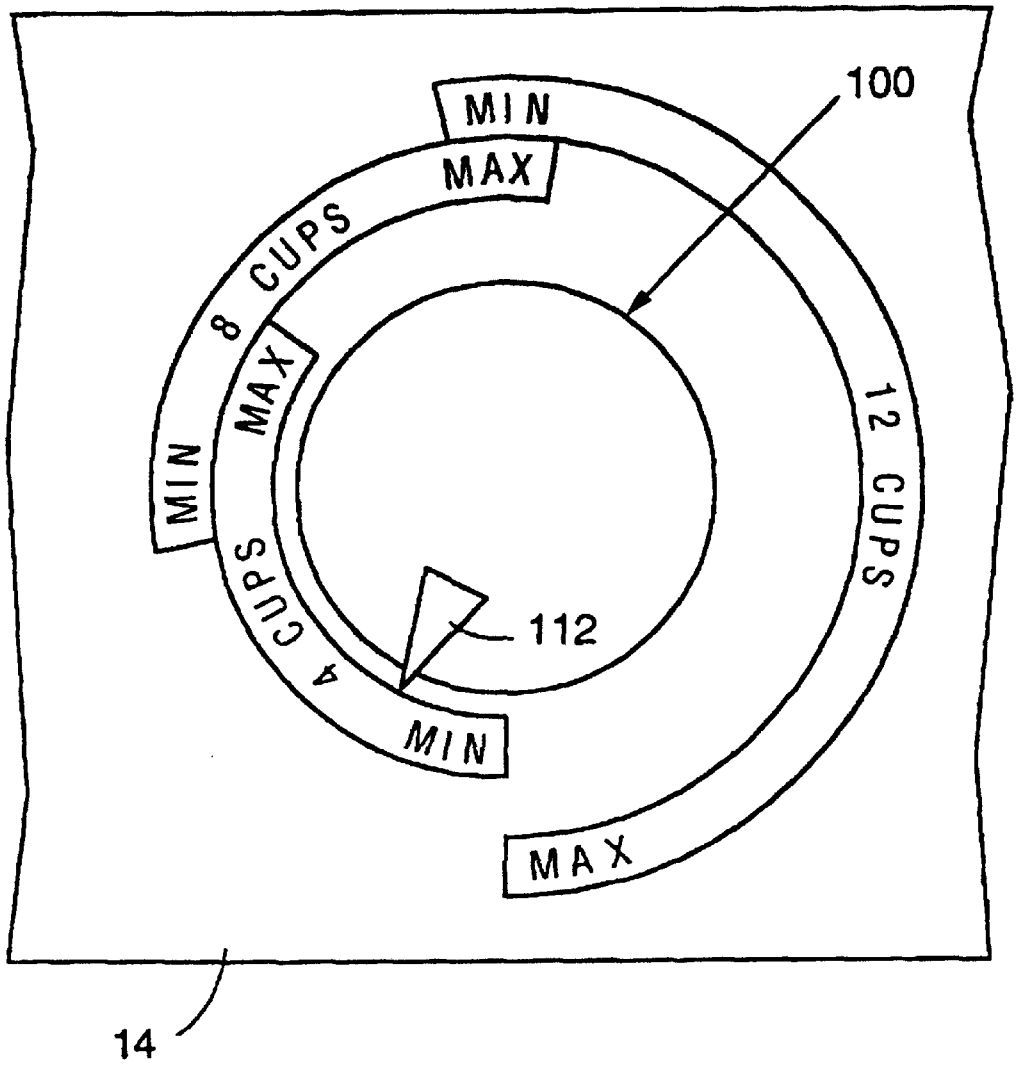
FIG. 9 is a front plan view of a valve body according to the present invention, showing the control knob and its surrounding markings.

The degree by which the cams 115 are made to constrict the tubing 76 is dependent upon the flow rate which, for a given volume of coffee, is needed in order to expose liquid to the grounds for the desired brew time. FIG. 9 shows an example of markings which may be imprinted on the valve body 14 surrounding the control knob 100 in order to inform a user as to how far the knob should be turned in a certain direction for a desired brew time. Arrow 112 is printed on control knob 100. As shown in the example of FIG. 9, for each volume of coffee (e.g. 4 cups, 8 cups, 12 cups) available to be made by the coffee maker, there is a range of brew times which extends from minimum ("min") to maximum ("max"). This preferably represents the 2 minute to 4 minute range of brew times at which standard ground coffee has been found to be most successfully brewed, and shorter durations for free ground coffee. Thus, for any volume of coffee, the amount by which the silicone tubing is constricted for a 2 minute brew time is less than the constriction which will be used for a 4 minute brew time. Moreover, the amount of constriction needed to brew four cups of coffee for a two minute brew time is significantly more than that needed to brew twelve cups of coffee for a two minute brew time, due to the differences in volume between the two.

Figure 8B:
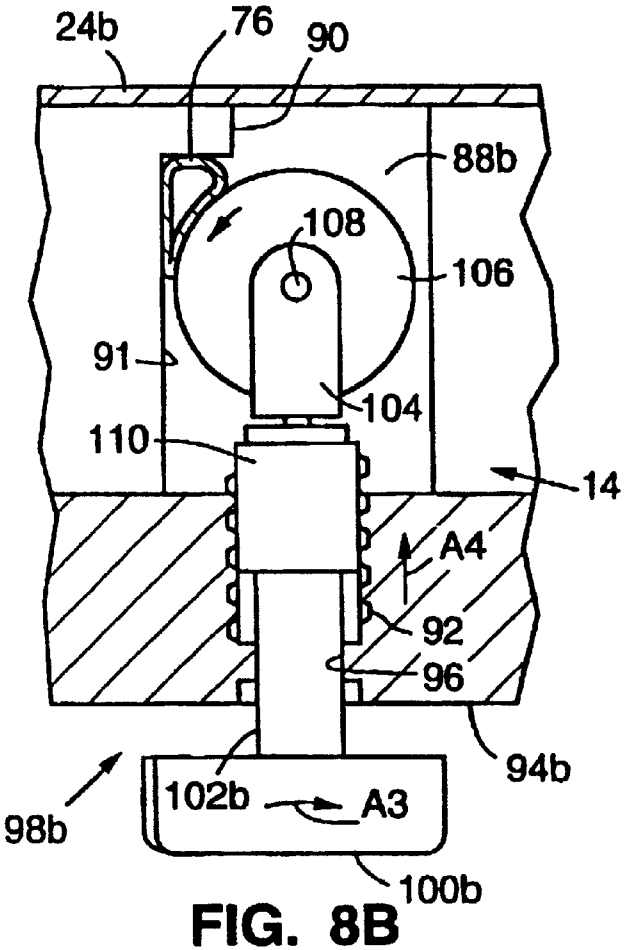
FIGS. 8A and 8B are partial cross-section views of the underside of a second embodiment of a valve body for use with the coffee maker of FIG. 2A.
Figure 8C:
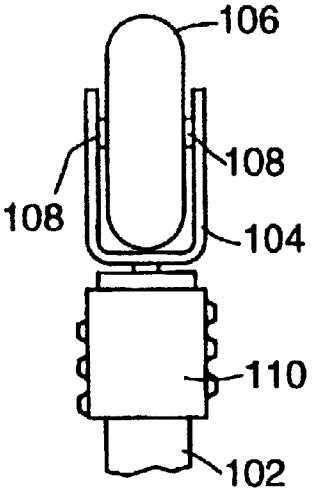
FIG. 8C is a side view of the roller of the valve body shown in FIGS. 8A and 8B.
Figure 8A:
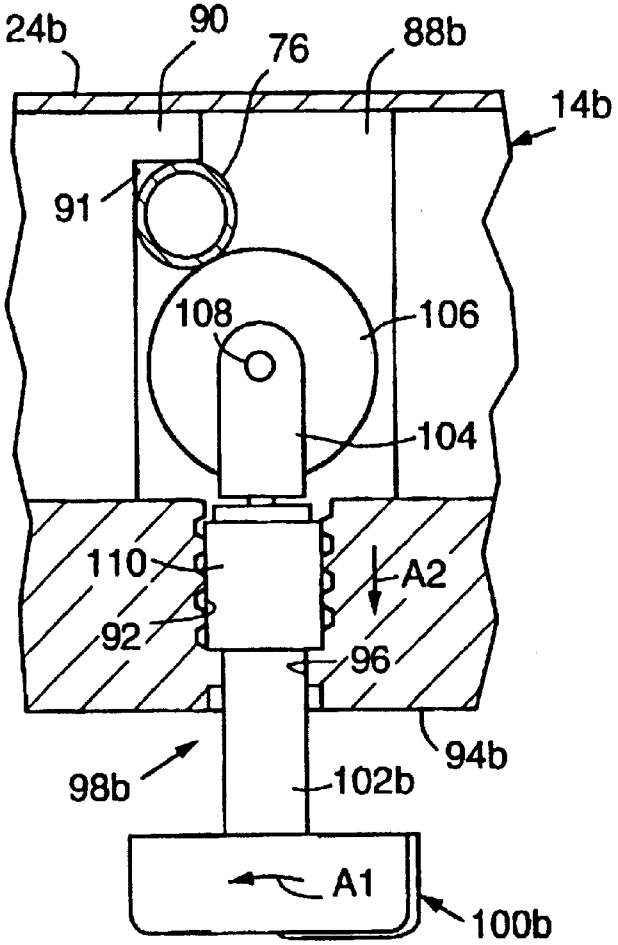

An alternative control valve design is shown in FIGS. 8A, 8B, and 8C. As shown, the valve body 14b has a substantially rectangular opening 88b. A short wall 90 extends into the opening 88b near back wall 24 of the housing 10. The silicone tube 76 which extends from cone 70 (see FIG. 4C) extends through the opening 88b such that it rests within a corner formed between short wall 90 and a side wall 91.

A threaded bore 92 extends through the valve body 14b from front 94 of the valve body 14b to the rectangular opening 88b. Bore 92 has a reduced diameter section 96 which is not threaded.

A control knob assembly, designated generally as 98b, is disposed within the bore 92. Control knob assembly 98b includes a rod 102b extending into the bore 92. At one end of the rod 102b is a control knob 100b which is located at the front 94b of the valve body. At the other end of the rod 102b is a roller mount 104 and a roller 106 mounted to the mount by a pin 108 so that it spins axially about the pin 108. The roller 106 is preferably made of rubber, plastic, or any other suitable material. Rod 102b includes a threaded portion 110 which is disposed within the threaded portion of the bore 92.

The control valve operates to control flow rate out of the brewing chamber by compressing the silicone tube 76 (or tube 376 of FIG. 6A) to restrict flow from it when a smaller volume of coffee is to be made, in order to ensure that the heated water remains in contact with the coffee grounds in the brewing chamber for the desired brew time. When a large volume of coffee is to be made, it is necessary to increase the flow rate through the valve so that the liquid is not exposed to the coffee grounds for too long. Little or no compression of the silicone tube is thus needed when large quantities of coffee are to be brewed.

Referring to FIG. 8A, when control knob 100b is turned in the direction of arrow A1, the interaction between the threaded portion of bore 92 and threaded sleeve 110 causes the control knob assembly 98 to move in the direction of arrow A2, away from the silicone tube 76. This is the "open" condition, at which maximum flow rate out of the brewing chamber is achieved, because there is no pressure by the roller 106 against the silicone tube 76.

When control knob is turned in the direction of arrow A3 in FIG. 8B, control knob assembly 98 moves in the direction of arrow A4. The roller 106 thus presses against the silicone tubing 76 to constrict the tubing. Because the tube 76 is positioned in a corner, however, its opening cannot be completely constricted by the roller.

Operation of the preferred embodiment will next be described. At the start of the coffee making process, the brewing chamber assembly 12 is disconnected from the coffee maker and the screen component 64 is separated from the cone 70. A user places a clean filter 78 in cone 70, and assembles the brewing chamber assembly 12 into the configuration shown in FIG. 3. The user next puts the appropriate quantity of ground coffee into the screen component 64.

The preferred quantities of grounds are: 10 scoops (where a standard coffee scoop is approximately 2 tablespoons) for 12 cups of coffee; 6⅔ scoops for 8 cups of coffee; and 3⅓ scoops for 4 cups of coffee for regular grind coffee (preferably using No. 7 grind coffee). Where an "espresso grind" is preferred, 7½ scoops of No. 5 grind coffee is used to make 4 cups of coffee.

The grounds are initially trapped by the screen 68, but later approximately 30% of the grounds fall through to the filter after a slurry is formed by the grounds and the heated water. The grounds may also be placed directly on the filter. In such a case, the grounds are carried through the screen as the grounds and the heated water form a slurry. Approximately 30% of these grounds then fall through the screen and onto the filter after liquid begins to drain from the chamber.

Next, the brewing chamber assembly 12 is mounted in the housing 10, such that screen holder 66 is coupled to the cover 84 and such that tube 76 is fed through opening 88 (FIG. 7A) of valve body 14 as shown in FIG. 7A.

If brew chamber assembly 312 of FIGS. 6A and 6B is used, extension 371 is first separated from cone 370, a clean filter 378 is placed in cone 370, and extension 371 is re-attached to cone 370. Ground coffee is scooped into the cone 370 and the brewing chamber 312 is mounted in the housing such that extension 371 is coupled to the cover 84 and such that tube 376 is fed through opening 88 of valve body 14 and positioned between the cams 115.

Next, cap 42 is removed from fill tube 40 (FIG. 2A), and a volume of cool or room temperature, or partially heated or preheated water equivalent to the volume of coffee to be brewed is poured through fill tube 40 and into vessel 32. It may also be desirable to use a quantity that is slightly more than the desired volume of coffee to account for losses due to absorption of water in the coffee grounds and to a smaller percentage due to steam evaporation. The cap 42 is then sealed in place on top of fill tube 40.

The user turns power switch 58 (FIG. 1) to the "on" position to activate heater 56. As the water in vessel 32 becomes heated, its volume increases. Vent 44 prevents this increase in volume from causing the water to flow through discharge tube 48 and onto the coffee grounds by allowing some of the air displaced by the expanding water to leave the vessel 32.

Once the water begins boiling, steam fills the space within the vessel 32 which lies above the water surface W. A small amount of steam is expelled by vent 44. Because the vent is small, the rate of steam production far exceeds the rate at which steam is released from the vent 44, and so pressure within the vessel 32 continues to increase.

The increased pressure inside the chamber forces the water downwardly in the vessel, and pushes it through discharge tube 48. The maximum pressure reached within the vessel 32 is approximately 15 inches of water. The rate at which heated water flows through discharge tube 48 is substantially constant (and is a function of the discharge tube size and the rate of steam production within the vessel). The preferred discharge tube diameter of 0.5 inches was selected for the preferred embodiment because it provides a constant flow and because it provides a flow rate that is sufficiently strong to cause complete mixing of water and grounds in the brewing chamber. The preferred embodiment pumps 12 cups (1.8 liters) of water out of vessel 32 in approximately 30 seconds. This is advantageous over prior art systems, such as the thermal pump system, because it delivers water to the brewing chamber at or near the industry-recommended temperature of 205° F. By contrast, the thermal pump systems deliver water at temperatures of between 170° and 185° F. to the brewing chamber.

It may also be desirable to configure the chamber such that water pre-heated and is maintained at an elevated temperature, and then elevated to the brewing temperature upon activation of a switch by the user. The heating chamber/discharge tube 48 may also be replaced by a heating chamber which is positioned directly above the brewing chamber and which, upon reaching brewing temperature, releases the water directly into the brewing chamber. In such a system, the temperature may be detected by a sensor such as one of the sensor types described with respect to FIG. 18, and release of the water into the brewing chamber may be carried out by use of a solenoid arrangement of the type described with respect to the embodiment of FIG. 18.

Figure 10B:
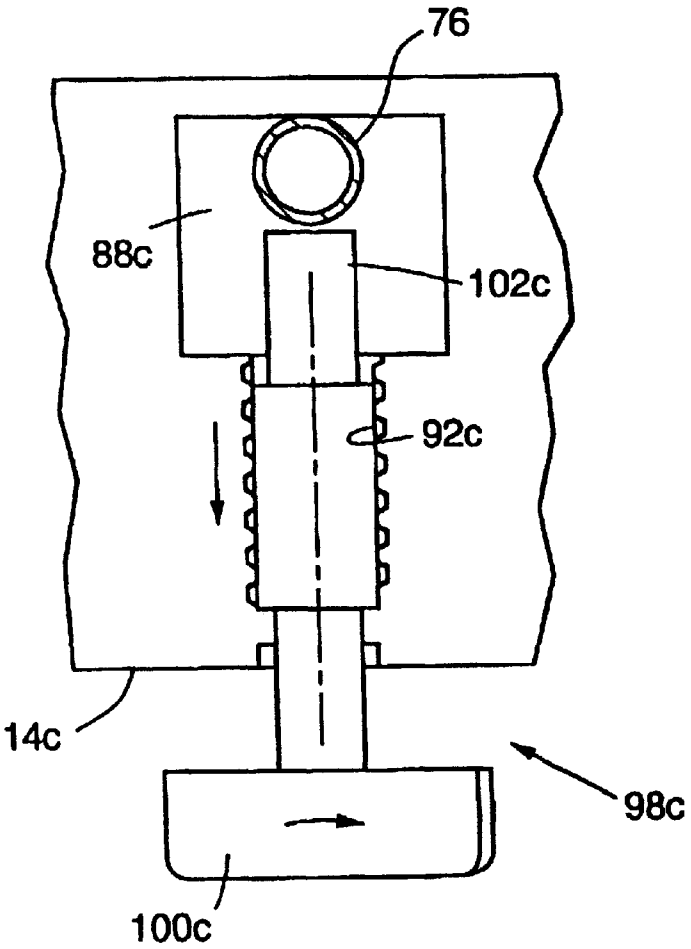
FIGS. 10A and 10B are partial cross-section views of the underside of a third alternative of a valve body of the coffee maker of the present invention.
Figure 10A:
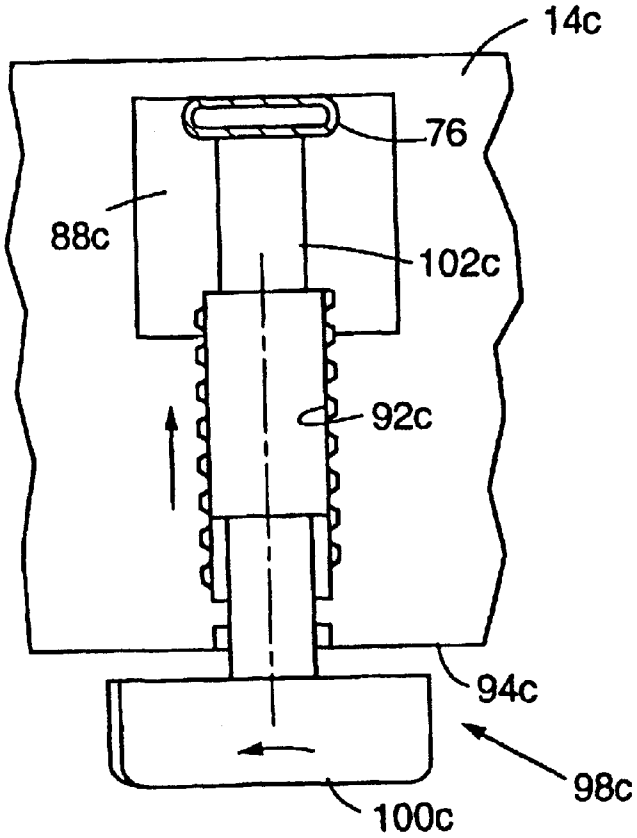

A third embodiment of a control valve assembly 98c is shown in FIGS. 10A and 10B. This control valve assembly 98c includes a rod 102c extending into a threaded bore 92c formed in the valve body 14c. At one end of the rod 102c is a control knob 100c which is located at the front 94c of the valve body 14c. The other end of the rod 102c is in contact with the silicone tube 76 extending from cone 70 (see FIG. 4C, or tubing 376 from cone 370, FIG. 6A), which extends through a substantially rectangular opening 88c in the valve body 14c. By rotating the control knob 100c in the manner described above, the rod 102c is made to constrict (FIG. 10A) or release (FIG. 10B) the silicone tubing 76.

Figure 11A:
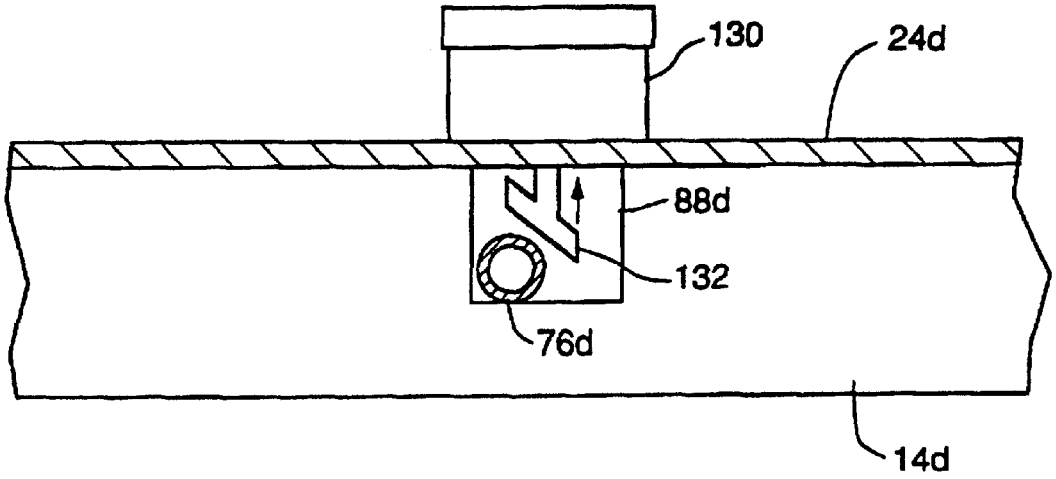
FIGS. 11A and 11B are partial cross-section views of the underside of a fourth embodiment of a valve body of the coffee maker of the present invention.
Figure 11B:
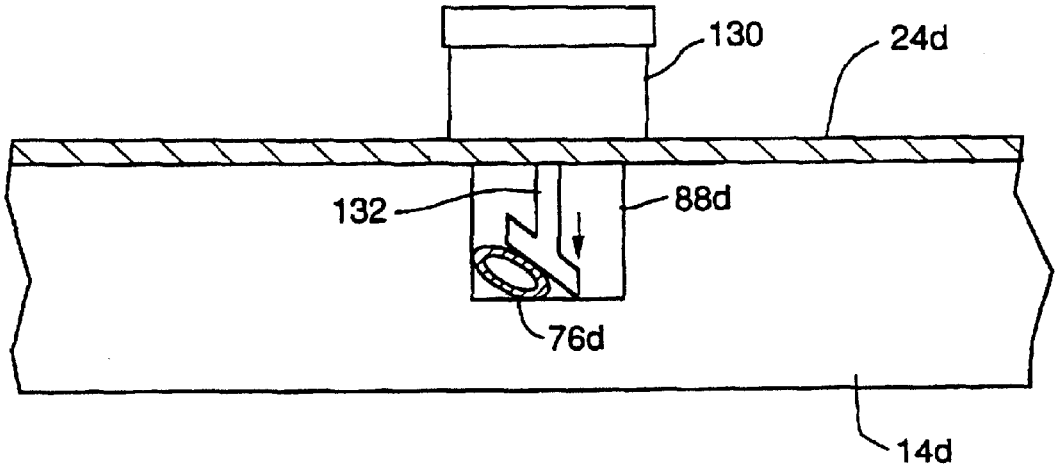

A fourth embodiment of a valve body 14d is shown in FIGS. 11A and 11B. As with the other valve body configurations, the valve body 14d includes an opening 88d through which the silicone tubing 76 from cone 70 (see FIG. 4C) at least partially extends. A stepper motor 130 is mounted to back wall 24d of the coffee maker housing 10 (housing shown in FIGS. 1–2B). A plunger 132 having a beveled end extends from the stepper motor 130 and through an opening in the back wall 24c. The plunger 132 and stepper motor 130 are coupled to one another such that activation of the stepper motor 130 moves the plunger 132 incrementally towards or away from the tube 76 in response to application of a drive signal to the stepper motor 130.

Figure 12:
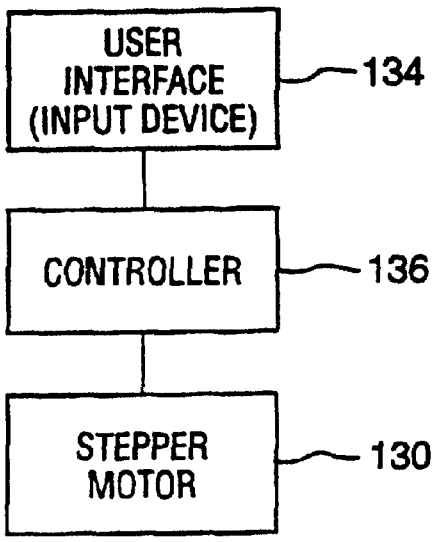
FIG. 12 is a simplified schematic representation of a coffee brewing system using the valve body of FIGS. 11A and 11B.

FIG. 12 is a simplified schematic diagram illustrating a coffee brewing system embodying the fourth embodiment of the valve body 14d. A user interface device 134 (which may be a keypad, dial, or any other form of input device) is provided which enables a user to input volume information representing the amount of coffee to be brewed (e.g. 4 cups, 6 cups, etc.) and to input the desired brew time (e.g. 2 minutes or 4 minutes). Alternatively, the apparatus may be pre-set to provide only a single brew time, such as 4 minutes, in which case the user input would relate only to the volume to be brewed. The user interface 134 interfaces with stepper motor 130 via a controller 136 which generates drive signals responsive to the user input.

Figure 13:
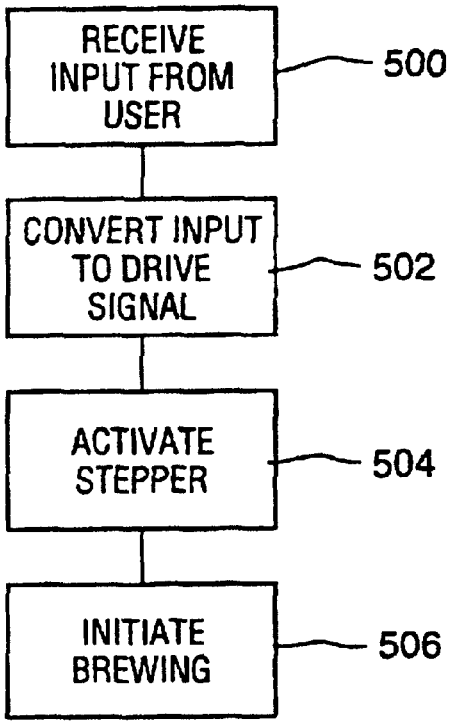
FIG. 13 is a simplified flow diagram illustrating operation of a coffee brewing system using the valve body of FIGS. 11A and 11B.
Figure 14:
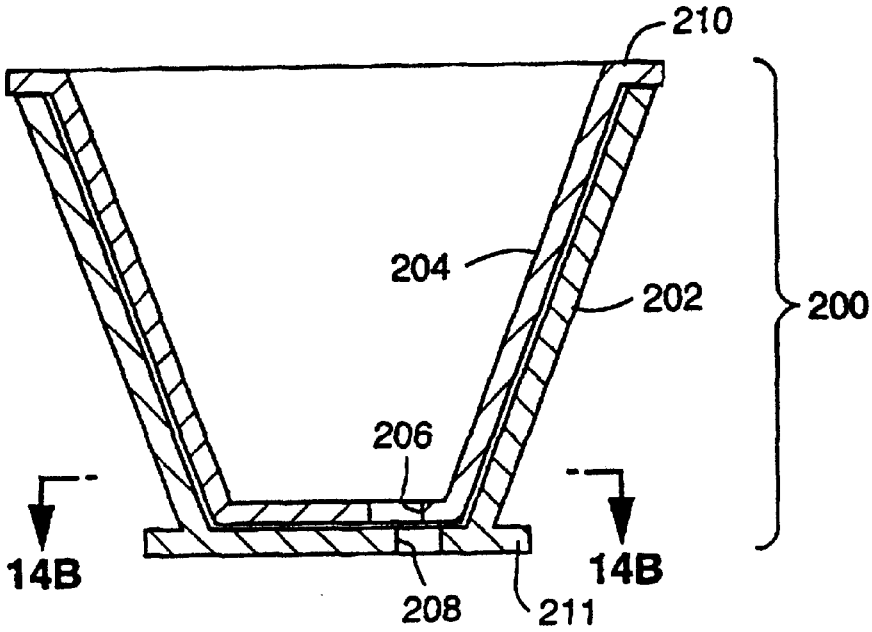
FIG. 14 is a side section view of a brewing chamber assembly for a fifth embodiment of a valve system according to the present invention.

The steps carried out by the system of FIGS. 11A and 11B are illustrated in the simplified flow diagram of FIG. 13. At step 500, input is received from the user (via interface 134). Controller 136 converts the input to drive signals for the stepper motor at step 502. It is preferable for the controller 136 to include memory tables representing the flow rates needed to achieve the desired brew times for the selected volumes. Also stored in the controller are data representing the drive signals needed to activate the stepper through the number (and direction) of step increments which will advance plunger 132 to constrict the tube 76 by the amount which will achieve the flow rate for the desired brew time. Thus, at step 502, the controller first determines the flow rate needed to give the appropriate desired brew time for the desired volume, and it then determines the stepper motor drive signals needed to constrict or open tube 76 by an amount which will achieve that flow rate.

Finally, at step 504, the drive signals are delivered to the stepper motor and the stepper motor is activated to set the aperture opening of the tube 76 (i.e. to constrict or release pressure against the tube by the plunger 132). After the aperture of the tube 76 is set, the brewing cycle is initiated at step 506 by manual activation of a power switch as described above or by other means (such as delivery of a signal by the controller 136 to the heater 56 of FIG. 2A).

In the above-described embodiments, flow rate is controlled (in order to achieve a predetermined brew time) by the use of various means for restricting flow through a silicone tube which discharges brewed coffee into a coffee pot or other receptacle. It should be appreciated that numerous other means for controlling the flow rate and/or setting the brew time may be utilized without exceeding the scope of the present invention.

For example, referring to the fifth embodiment of FIGS. 14 through 17, a brewing chamber 200 may be provided which includes a pair of nested cones 202, 204. A first aperture 206 is formed in the floor of inner cone 204, and a second aperture 208 is formed in the floor of outer cone 202. The brewing chamber 200 may be mountable within a housing similar to the housing 10 in FIG. 1, or it may be provided with flanges 211 which allow it to be placed directly on top of a coffee receptacle.

Figure 15A:
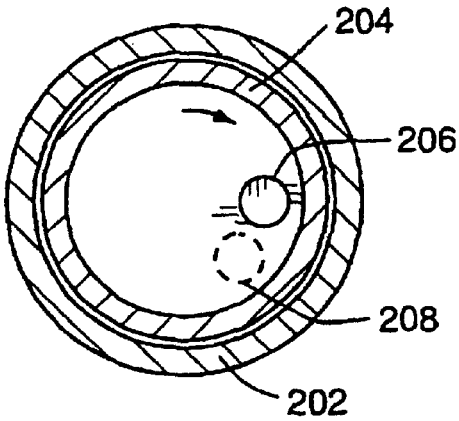
FIGS. 15A through 15D are a series of top section views of the brewing chamber of FIG. 14, showing varying degrees of alignment of the apertures of the inner and outer cones.
Figure 15B:
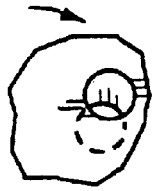
Figure 15C:
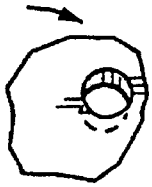
Figure 15D:
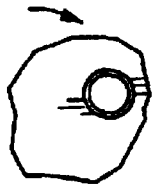

Inner cone 204 is manually rotatable within outer cone 206. A lip 210 extends from the upper perimeter of the inner cone 204 to facilitate grasping of the inner cone for rotation. As shown in FIGS. 15A through 15D, rotation of inner cone 204 relative to outer cone 202 causes aperture 206 in inner cone to move towards or away from the aperture 208 in outer cone. When there is no overlap of the apertures 206, 208, liquid cannot flow through the apertures into an underlying coffee receptacle. As inner cone 204 is rotated relative to outer cone 202, the aperture 206 begins to overlap the aperture 208 to increase the effective opening of the apertures as shown in FIGS. 15B–15D, and to thereby increase the rate at which liquid will flow out of the brewing chamber 200. It should be appreciated that other configurations, in which a first body having apertures is moved relative to a second body having second apertures in order to increase or decrease partial overlap of the apertures, may likewise be used within the scope of the present invention.

Figure 16:
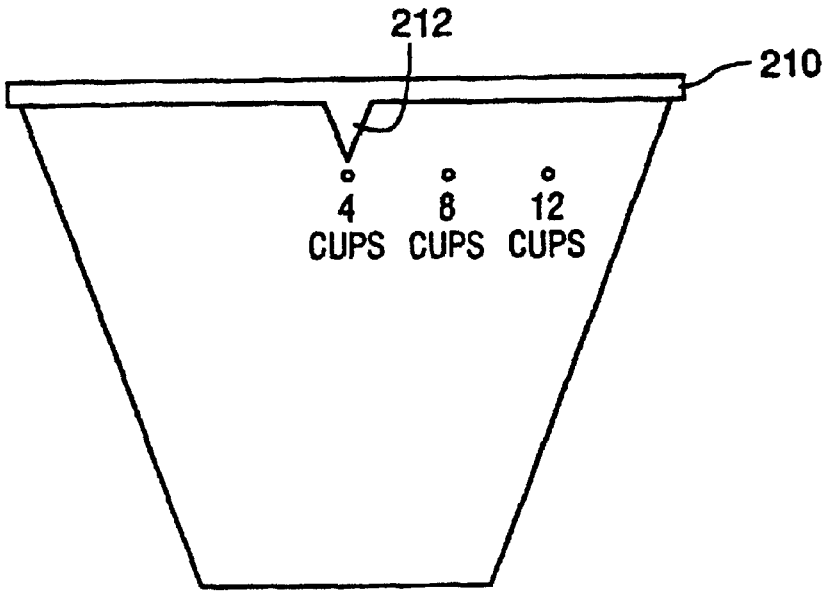
FIGS. 16 and 17 are side views of the brewing chamber of FIG. 14, illustrating different markings which may be printed on the side of the cone to facilitate user control of brew time.
Figure 17:
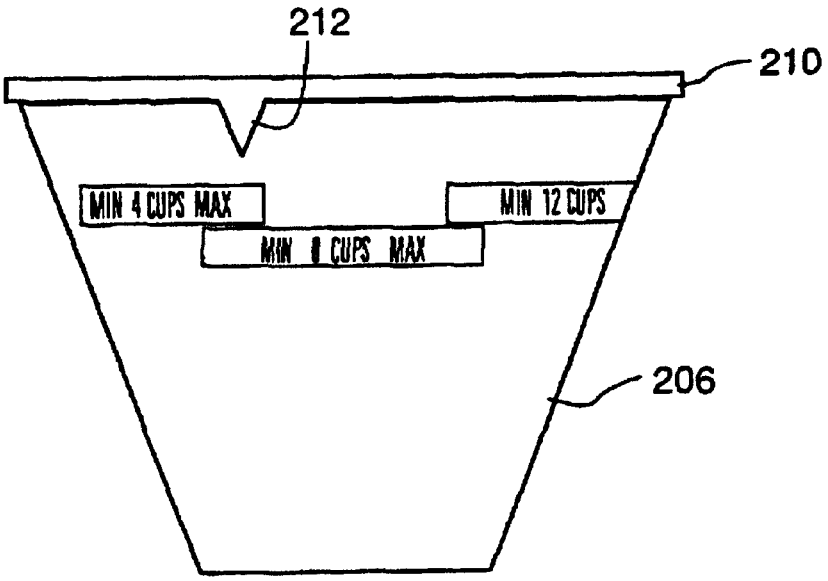

Referring to FIGS. 16 and 17, an indicator arrow 212 extends downwardly from the lip 210. Printed on the exterior surface of the outer cone 206 are markings representing the volume of coffee to be brewed (see FIG. 16) and/or the volume to be brewed in combination with a range (preferably a "minimum" of 2 minutes and a "maximum" time of 4 minutes) of available brew times (see FIG. 17). The location of each marking is selected such that the flow rate of liquid passing through the apertures gives the appropriate brew time for the selected volume of coffee. For example, in the embodiment of FIG. 16 a user desiring to brew four cups of coffee would position indicator 212 into alignment with the markings indicating "4 cups." In the embodiment of FIG. 17, which provides the user with a short range of available brew times, a user desiring to brew 4 cups of coffee using the maximum brew time of 4 minutes would rotate the inner cone 204 until the indicator 212 is positioned as shown in FIG. 17. A user wishing to brew 8 cups of coffee at the maximum brew time of 4 minutes would rotate inner cone 204 until indicator 212 pointed to "max" in the "8 cups" band. As with all of the brew times given herein, it should be pointed out that the brew times described with respect to this embodiment are used for illustration purposes only. The variations by design and application are far greater than these examples.

Alternatively, a cone may be configured to have interchangeable bottom inserts, each having differently-sized apertures each of which permits release of coffee from the brew chamber into a coffee pot at a different flow rate. Such a configuration would allow the user to select an insert having apertures which would provide the desired brew time for a particular volume of water.

Figure 18:
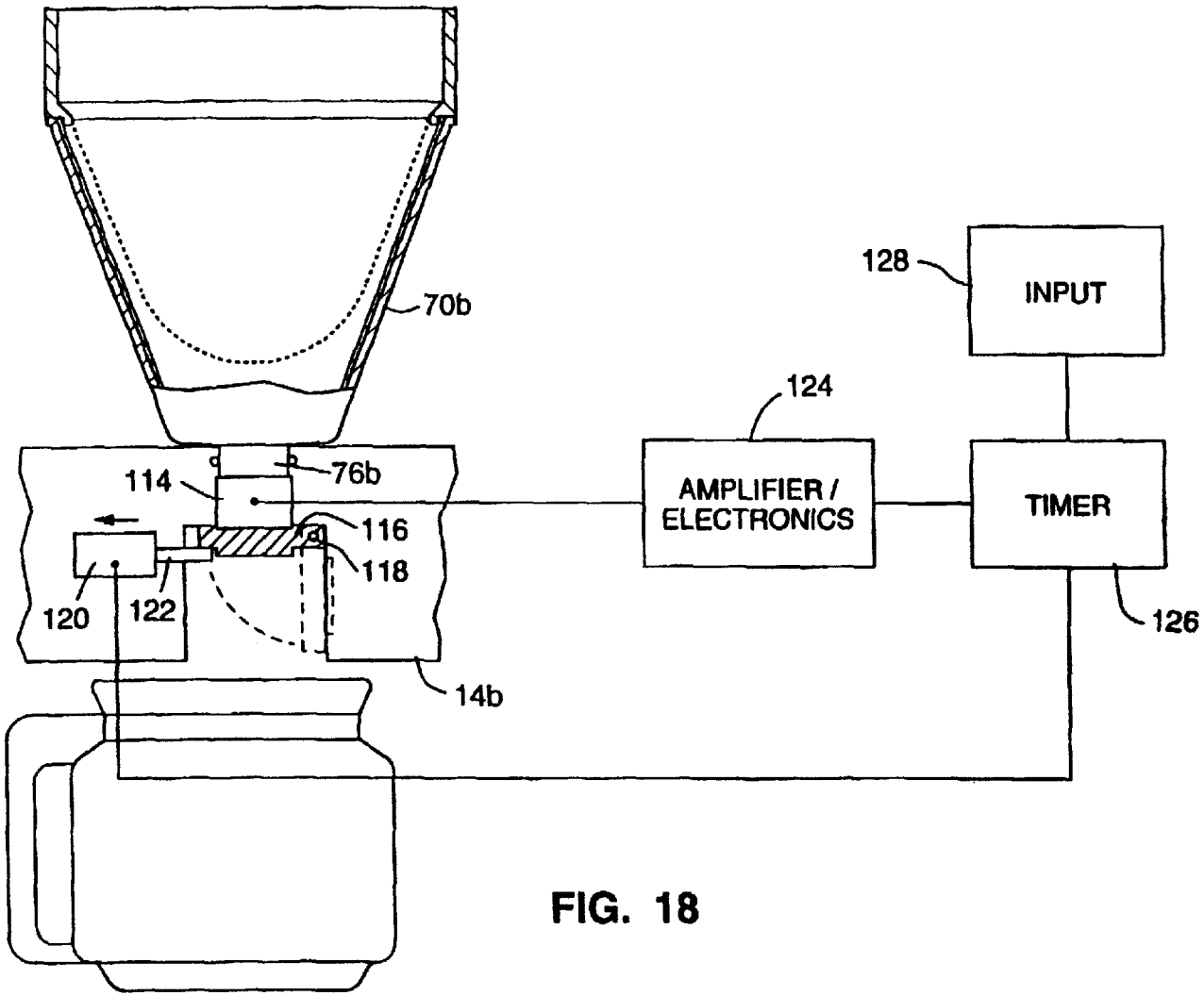
FIG. 18 is a side plan view of a sixth embodiment of a valve system according to the present invention, showing an amplifier circuit, a timer, and an input device in simplified schematic form.

A sixth embodiment of a control valve is shown in FIG. 18. In this embodiment, which is particularly useful for brewing teas, the heated water is held in the brewing chamber for the duration of the desired brew time, and then quickly released into an underlying container at the end of the brew time.

Referring to FIG. 18, tube 76 which extends from cone 70 is equipped with a sensor 114 for detecting the presence of heated water in the brewing chamber 14. The sensor 114 can be one of several types of generally known sensors capable of sensing liquid, an increase in mass, or an increase in temperature. For example, the sensor 114 may be a thermocouple which detects an increase in temperature in the tube 76. Alternatively, the sensor 114 may be a conductivity probe which senses the presence of water inside the tube, since water is more highly conductive than air.

The opening of the tube 76 is covered by a valve door 116. Valve door 116 is pivotable about a pin 118 between an opened condition (shown in dashed lines) and a closed position, and it is biased in its opened condition by conventional means. A spring loaded solenoid 120 is mounted to the valve body 14c, and includes a pin 122 which, when the solenoid 120 is in a non-energized state, abuts the valve door 116 to hold it in the closed condition.

The sensor 114 is electrically coupled to an amplifier circuit 124 capable of amplifying a detection signal from the sensor (indicating that heated water has entered the brewing chamber). A timer 126 is electrically coupled to the amplifier circuit 124. An input device 128 (such as a keypad, control knob, or other input device) is also coupled to the timer 126. The output of the timer 126 is electrically coupled to the solenoid 120.

Prior to beginning the brewing process, a user uses the input device 128 to set the timer 126 by inputting data corresponding to the desired brew time. The user then activates the power switch for the heating element as described above. Once the sensor 114 detects the presence of heated water in the brewing chamber, it delivers a signal to the timer 126 via amplifier circuitry 124. The timer 126 counts down for the desired brew time, at the end of which it delivers a current pulse to solenoid 120.

Energization of solenoid 120 causes pin 122 to retract and to thereby allow valve door 116 to pivot in accordance with its bias into the open condition. The brewed coffee is thus released from the chamber. For this embodiment, it is desirable to provide the tube 76 to have as large a diameter as possible. This will allow brewed coffee to exit the brewing chamber at a fast flow rate so as not to increase the brew time. The time it takes for brewed coffee to leave the chamber is calculated into, and is a function of, the brew time.

In the sixth embodiment, a bi-metallic spring (not shown) positioned within or adjacent to the brewing chamber may be used in place of the sensor 114. Such a spring would mechanically deform in response to the presence of heat and would be used to mechanically activate the countdown timer 126.

Input Control

The above-described embodiments maintain a constant brew time regardless of volume by controlling fluid flow out of the brewing chamber. Fluid flow may alternatively be controlled at the input side of the brewing chamber. In other words, the rate at which heated water is pumped into the brewing chamber may be controlled in order to maintain a predetermined brew time.

Figure 19:
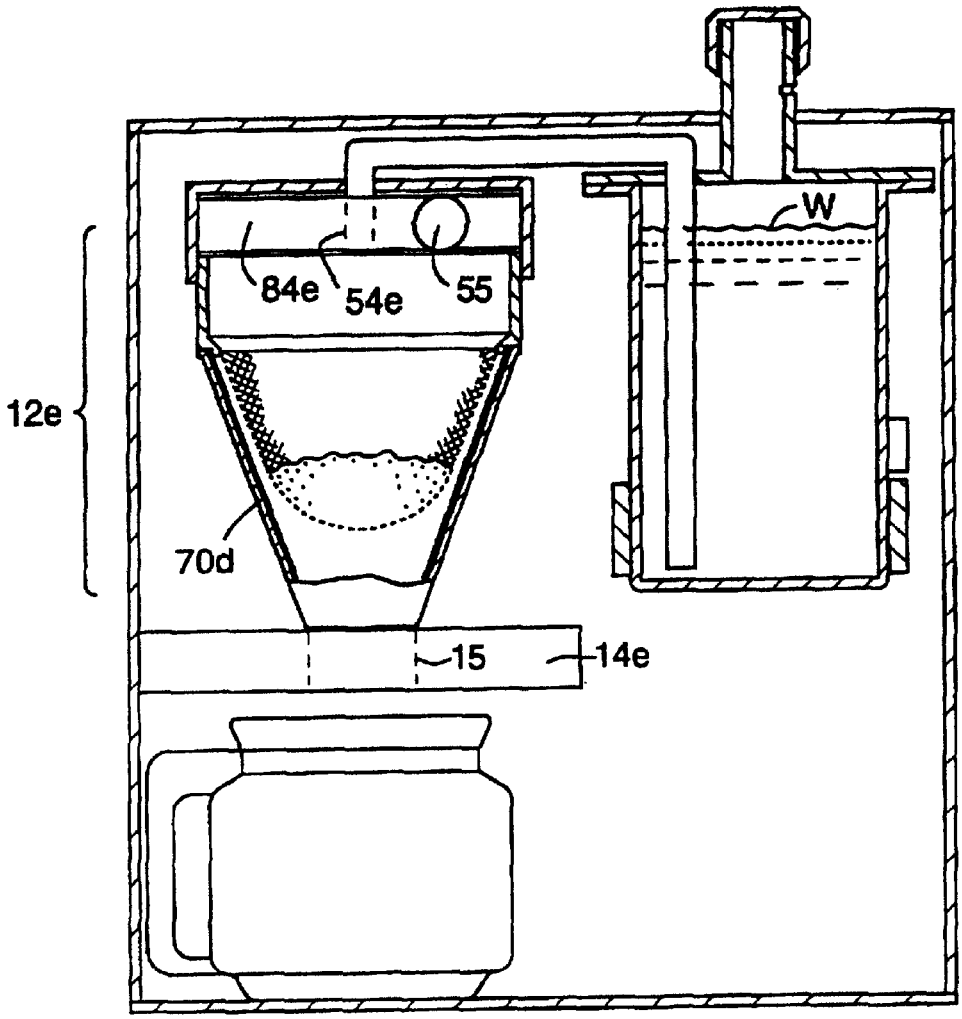
FIG. 19 is a partial cross-sectional side view of a seventh embodiment of a coffee making system according to the present invention, in which brew time is controlled by controlling flow rate of water into the brewing chamber.

One embodiment of a coffee maker having input-side control is shown in FIG. 19. Many of the components in the FIG. 19 embodiment are like those of the preferred embodiment shown in FIG. 2A and will not be re-described. However, unlike the preferred embodiment, discharge tube 54e is formed of flexible silicone tubing and cover 84e is a valve body which has a control knob 55 and which may have a structure similar to that of one of the valve bodies shown in FIGS. 7A–7B, 8A–8B, 10A–10B, and 12A–12B. Thus, by turning knob 55, a user can control the rate at which heated water flows into the brewing chamber 12e. As with those embodiments, turning the knob applies or removes pressure against the tube to alter its effective area or aperture.

The FIG. 19 embodiment also differs from the preferred embodiment in that body 14e is not a valve body but simply a body having a wide discharge opening 15 which is aligned with a similarly proportioned opening at the bottom of cone 70e. Since brew time will be regulated by controlling the rate of flow into the brewing chamber, the large diameter opening is desired so that coffee can quickly drain from the brewing chamber 12e so as to not extend the brewing time.

Many other means for controlling flow into the brewing chamber may also be utilized without exceeding the scope of the present invention. For example, a pump having a variable stroke rate can be used to pump heated water into the brewing chamber. Alternatively, the power to the heater (such as heater 56 in FIG. 2B) can be varied to control the rate at which it pumps heated water into the brewing chamber.

Conclusion

Several embodiments of a new system for making brewed beverages have been shown and described. These examples have been described by way of example and are not intended to limited the scope of the appended claims. It should be appreciated that additional embodiments may be devised (such as, but not limited to, by combining the features of the various embodiments described above, or by adding a preheat function for water in the reservoir) which fall within the scope of the present invention.

We claim:

1. Apparatus for brewing a desired volume of coffee comprising:

(a) a receptacle for receiving brewed coffee;

(b) a brewing chamber including a filter within the brewing chamber for holding coffee grounds;

(b) means for selecting a volume of water corresponding to the desired volume of coffee to be brewed;

(d) means for heating the water to brewing temperature and directing the heated water into the brewing chamber for contact with the coffee grounds in the filter basket;

(e) means for maintaining contact between at least a portion of the heated water and the coffee grounds for a period of time which is substantially independent of the selected volume of coffee to be brewed; and (f) means for transferring the brewed coffee into the receptacle.

2. The apparatus of claim 1 having a reservoir for containing the selected volume of water prior to brewing with both the brewing chamber and the receptacle being larger in volume than the reservoir.

3. The apparatus of claim 2 in which the means for heating the selected volume of water comprises means for heating the water substantially to brewing temperature in the reservoir prior to commencing transfer of the water to the brewing chamber.

4. The apparatus of claim 1 which a screen is mounted in the brewing chamber between the reservoir and the filter to intercept coffee grounds before the grounds reach the filter to increase the coffee flow rate through the filter.

*5. Apparatus for brewing a desired volume of tea comprising:*

*(a) a receptacle for receiving brewed tea;*

*(b) a brewing chamber including a filter within the brewing chamber for holding tea leaves;*

*(c) means for selecting a volume of water corresponding to the desired volume of tea to be brewed;*

*(d) means for heating the water to brewing temperature and directing the heated water into the brewing chamber for contact with the tea leaves in the filter;*

*(e) means for maintaining contact between at least a portion of the heated water and the tea leaves for a period of time which is substantially independent of the selected volume of tea to be brewed; and*

*(f) means for transferring the brewed tea into the receptacle.*

*6. The apparatus of claim 5 having a reservoir for containing the selected volume of water prior to brewing with both the brewing chamber and the receptacle being larger in volume than the reservoir.*

*7. The apparatus of claim 6 in which the means for heating the selected volume of water comprises means for heating the water substantially to brewing temperature in the reservoir prior to commencing transfer of the water to the brewing chamber.*

*8. The apparatus of claim 5 in which a screen is mounted in the brewing chamber between the reservoir and the filter to intercept tea leaves before the leaves reach the filter to increase the tea flow rate through the filter.*

*9. Apparatus for brewing a desired volume of a beverage brewed from water and biological substances selected from the group comprising coffee ground elements and tea leaf elements comprising:*

*a receptacle for receiving said brewed beverage;*

*a brewing chamber including a filter within the brewing chamber for holding said biological substances;*

*means to select a volume of water corresponding to the desired volume of beverage to be brewed;*

*a heater to heat the selected volume of water to brewing temperature and directing the heated selected volume of water into the brewing chamber for contact with the biological substances in the filter;*

*means for at least a portion of said selected volume of heated water being maintained in contact with said biological substances for a period of time which is substantially independent of the selected volume of beverage to be brewed; and*

*an opening to transfer the brewed beverage into the receptacle.*

*10. The apparatus of claim 9 including a reservoir for containing the selected volume of water prior to brewing with both the brewing chamber and the receptacle being larger in volume than the reservoir.*

*11. The apparatus of claim 10 in which the heater for heating the selected volume of water heats the water substantially to brewing temperature in the reservoir prior to commencing transfer of the water to the brewing chamber.*

*12. The apparatus of claim 9 in which a screen is mounted in the brewing chamber between the reservoir and the filter to intercept biological substances before the biological substances reach the filter to increase the beverage flow rate through the filter.*

*13. Apparatus for brewing a desired volume of brewed beverage made from biological substances selected from the group consisting of coffee grounds and tea leaves, comprising:*

*a receptacle for receiving said brewed beverage;*

*a brewing chamber including a filter within the brewing chamber for holding said biological substances;*

*means for selecting a volume of water corresponding to the desired volume of beverage to be brewed;*

*a heated to heat the water to brewing temperature and automatically directing the heated water into the brewing chamber for contact with the biological substances in the filter;*

*means for at least a portion of heated water and the biological substances maintaining in contact for a period of time which is substantially independent of the selected volume of beverage to be brewed; and*

*means for automatically transferring the brewed beverage into the receptacle.*

*14. The apparatus of claim 13 having a reservoir to contain the select volume of water prior to brewing with both the brewing chamber and the receptacle being larger in volume than the reservoir.*

*15. The apparatus of claim 14 in which the heater for heating the selected volume of water heats the water substantially to brewing temperature in the reservoir prior to commencing transfer of the water to the brewing chamber.*

*16. The apparatus of claim 13 in which a screen is mounted in the brewing chamber between the reservoir and the filter to intercept the biological substances before the biological substances reach the filter to increase the beverage flow rate through the filter.*

*17. An apparatus for brewing a desired volume of brewed beverage made from biological substances selected from the group consisting of coffee grounds and tea leaves, comprising:*

*a brewing chamber having a capacity at least equal to said desired volume;*

*a receptacle for receiving brewed beverage having a capacity at least equal to said desired volume;*

*a flow control valve between said brewing chamber and said receptacle, whereby said flow control valve adjustably controls the flow of brewed beverage from said brewing chamber into said receptacle; and*

*a screen removably mounted in said brewing chamber for holding said biological substances, whereby water introduced into said brewing chamber forms a slurry with said biological substances, whereby a screened portion of said biological substances is screened by said screen and thereby prevents said biological substances from being more flow restrictive than said flow control valve.*

*18. An apparatus according to claim 17, further comprising:*

*a filter holder holding a filter mounted between brewing chamber and said receptacle.*

*19. An apparatus according to claim 18, further comprising:*

*a housing;*

*a vessel having a capacity at least equal to said desired volume mounted in said housing;*

*a heater operatively connected to said vessel, whereby said heater can heat water in said vessel to a brewing temperature; and*

*a pump operably connected between said vessel and said brewing chamber to pump water heated to said brewing temperature into said brewing chamber;*

*said brewing chamber being mounted in said housing.*

*20. An apparatus according to claim 19, wherein said pump comprises a discharge tube extending between said vessel and said brewing chamber, whereby water heated in said vessel to a brewing temperature is forced through said discharge tube into said brewing chamber.*

*21. An apparatus according to claim 19, wherein said pump forces said water into said brewing chamber in chamber in approximately 30 seconds.*

*22. An apparatus according to claim 19, further comprising:*

*a thermostat operatively connected to said vessel to maintain said water at said brewing temperature in said vessel.*

*23. An apparatus according to claim 22, wherein said thermostat maintains said water at a brewing temperature when said water is pumped into said brewing chamber of between approximately 185 degrees Fahrenheit and approximately 212 degrees Fahrenheit.*

*24. An apparatus for brewing a desired volume of brewed beverage made from biological substances selected from the group consisting of coffee grounds and tea leaves, comprising:*

*a brewing chamber having a capacity at least equal to said desired volume;*

*a receptacle for receiving brewed beverage having a capacity at least equal to said desired volume;*

*a flow control valve between said brewing chamber and said receptacle, whereby said flow control valve adjustably controls the flow of brewed beverage from said brewing chamber into said receptacle;*

*a filter holding means for holding a filter mounted in said brewing chamber; and*

*a weir detachably mounted above said filter holder means for capturing biological substances, whereby water introduced into said brewing chamber forms a slurry with said biological substances, whereby a settled portion of said biological substances settles on said weir and thereby prevents biological substances filtered by said filter from being more flow restrictive than said flow control valve.*

*25. An apparatus according to claim 24, further comprising:*

*a housing;*

*a vessel having a capacity at least equal to said desired volume mounted in said housing;*

*a heater operatively connected to said vessel, said heater adapted to heat water in said vessel to a brewing temperature; and*

*a pump operably connected between said vessel and said brewing chamber to pump water heated to said brewing temperature into said brewing chamber, wherein said brewing chamber is mounted in said housing.*

*26. An apparatus for brewing a desired volume of brewed beverage made from biological substances selected from the group comprising coffee grounds and tea leaves, comprising:*

*a housing;*

*a vessel having a capacity at least equal to said desired volume mounted in said housing;*

*a heater operatively connected to said vessel, said heater adapted to heat water in said vessel to a brewing temperature;*

*a brewing chamber mounted in said housing;*

*a pump operably connected between said vessel and said brewing chamber;*

*a receptacle for receiving brewed beverage having a capacity at least equal to said desired volume;*

*a flow control valve between said vessel and said brewing chamber, whereby said flow control valve adjustably controls the flow of heated water from said vessel into said brewing chamber;*

*a filter holder means for holding a filter mounted between said vessel and said brewing chamber;*

*a screen mounted above said filter holder means, whereby water introduced into said brewing chamber forms a slurry with said biological substances, whereby a screened portion of said biological substances is screened by said screen and thereby prevents biological substances filtered by said filter from being more flow restrictive than said flow control valve; and*

*a body having a large discharge opening in fluid communication with said brewing chamber, whereby brewed beverage can quickly drain from said brewing chamber so as not to extend brew time.*

*27. An apparatus according to claim 26, further comprising:*

*a valve door controllably closing said brewing chamber; and*

*a timer cooperatively connected to said valve door to automatically release brewed beverage from said brewing chamber into said receptacle after said brew time.*

*28. An apparatus according to claim 19, wherein said pump comprises:*

*a lid sealing said vessel;*

*a fill tube having a vent hole extending through said lid; and*

*a discharge tube extending between said vessel and said brewing chamber; whereby heating said water in said vessel causes steam to form in said vessel, and said steam increases pressure in said vessel to force heated water out of said vessel and into said brewing chamber, and a portion of said steam escapes through said vent hole.*

*29. An apparatus according to claim 28, wherein said vent hole has a diameter of approximately 0.03 inches.*

*30. An apparatus according to claim 17, wherein said flow control valve is controllable to allow said desired volume of beverage to flow into said receptacle after a brew time of between approximately 30 seconds and approximately 4 minutes.*

*31. An apparatus according to claim 17, wherein said flow control valve comprises:*

*a pair of nested cones, each cone having an aperture, said cones being rotatable with respect to each other, whereby rotating said cones causes said apertures to overlap and increase or decrease the rate at which liquid flows out of said brewing chamber.*

* * * * *